United States Patent
Zhang et al.

(10) Patent No.: US 10,680,770 B2
(45) Date of Patent: Jun. 9, 2020

(54) INTER-CELL BEAM COORDINATION SCHEDULING METHOD AND RELATED DEVICE

(71) Applicant: HUAWEI TECHNOLOGIES CO., LTD., Shenzhen, Guangdong (CN)

(72) Inventors: Pan Zhang, Chengdu (CN); Yazhen Ren, Chengdu (CN); Chenggang Jiang, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/519,829

(22) Filed: Jul. 23, 2019

(65) Prior Publication Data

US 2019/0349151 A1 Nov. 14, 2019

Related U.S. Application Data

(63) Continuation of application No. PCT/CN2018/073674, filed on Jan. 22, 2018.

(30) Foreign Application Priority Data

Jan. 26, 2017 (CN) .......................... 2017 1 0058346

(51) Int. Cl.
*H04W 72/08* (2009.01)
*H04L 5/00* (2006.01)
(Continued)

(52) U.S. Cl.
CPC .......... *H04L 5/0032* (2013.01); *H04W 72/046* (2013.01); *H04W 72/0446* (2013.01); *H04W 72/082* (2013.01); *H04W 72/1284* (2013.01)

(58) Field of Classification Search
CPC ..... H04W 72/04; H04W 72/12; H04W 72/08; H04W 72/046; H04L 5/00; H04L 5/0032
See application file for complete search history.

(56) References Cited

U.S. PATENT DOCUMENTS 10,484,885 B2 * 11/2019 Kim ...................... G01S 5/0054
2014/0073337 A1 * 3/2014 Hong .................... H04W 16/28
455/452.1
(Continued)

FOREIGN PATENT DOCUMENTS

CN 101753191 A 6/2010
CN 104779986 A 7/2015
(Continued)

OTHER PUBLICATIONS

PCT International Search Report and Written Opinion issued in International Application No. PCT/CN2018073674, dated Apr. 11, 2018, 15 pages (With English Translation).
(Continued)

*Primary Examiner* — Khawar Iqbal
(74) *Attorney, Agent, or Firm* — Fish & Richardson P.C.

(57) ABSTRACT

The present disclosure relates to inter-cell beam coordination scheduling methods and related devices. One example inter-cell beam coordination scheduling method includes receiving, by a first wireless access device serving a coordinated cell, a coordination scheduling request specific to an edge user terminal of a serving cell, where the coordination scheduling request carries an indication of a downlink narrow-transmission beam set $D_{x1}$, and the downlink narrow-transmission beam set $D_{x1}$ is a downlink narrow-transmission beam set that satisfies a principle of minimal interference and that is determined by the edge user terminal through beam training, and in a slot in which downlink scheduling is performed on the edge user terminal in the serving cell, preferably using, by the first wireless access device, a narrow-transmission beam in the downlink narrow-transmission beam set $D_{x1}$ to schedule a camping user terminal of the coordinated cell in downlink.

10 Claims, 10 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2014/0098912 A1 | 4/2014 | Yin et al. | |
| 2016/0270086 A1* | 9/2016 | Stirling-Gallacher | ........................ H04W 72/1226 |
| 2017/0105223 A1* | 4/2017 | Zhang | .................. H04W 16/10 |
| 2018/0331807 A1* | 11/2018 | Kim | ...................... H04W 72/04 |
| 2019/0013983 A1* | 1/2019 | Gao | .................. H04L 27/2655 |
| 2019/0045481 A1* | 2/2019 | Sang | ...................... H04B 1/7156 |
| 2019/0124635 A1* | 4/2019 | Nam | ...................... H04L 1/0038 |
| 2019/0215845 A1* | 7/2019 | Hu | ........................ H04W 52/02 |
| 2019/0230588 A1* | 7/2019 | Kim | ...................... H04W 48/20 |
| 2019/0238282 A1* | 8/2019 | Cao | ........................ H04B 7/024 |
| 2019/0349152 A1* | 11/2019 | Islam | .................. H04W 72/046 |
| 2019/0350028 A1* | 11/2019 | Kaasalainen | ......... H04W 76/11 |

FOREIGN PATENT DOCUMENTS

| | | |
|---|---|---|
| CN | 106341170 A | 1/2017 |
| WO | 2016124218 A1 | 8/2016 |

OTHER PUBLICATIONS

Extended European Search Report issued in European Application No. 18745140.6 dated Nov. 27, 2019, 7 pages.
Office Action issued in Chinese Application No. 201710058346.0 dated Mar. 2, 2020, 6 pages.

\* cited by examiner

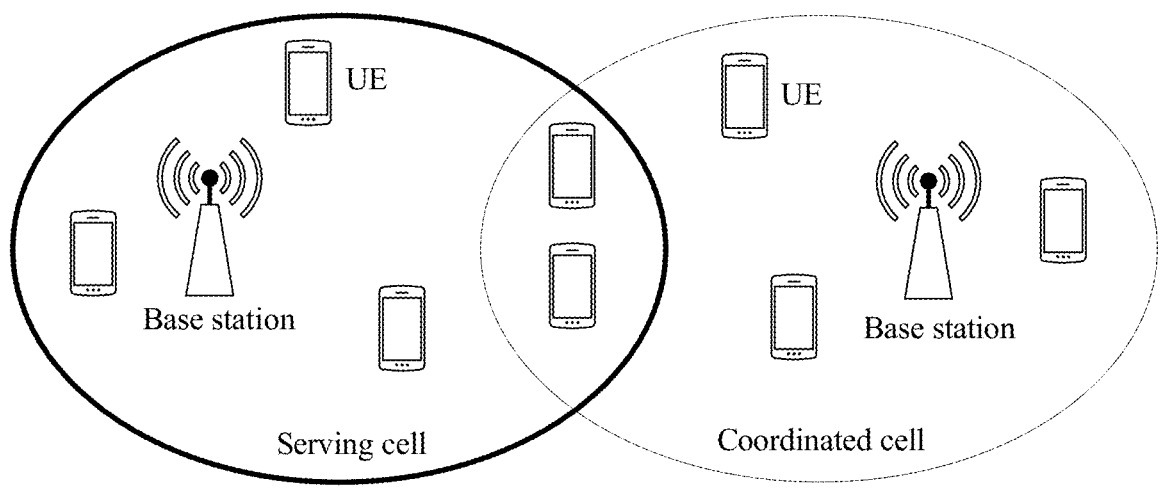
FIG. 1-A

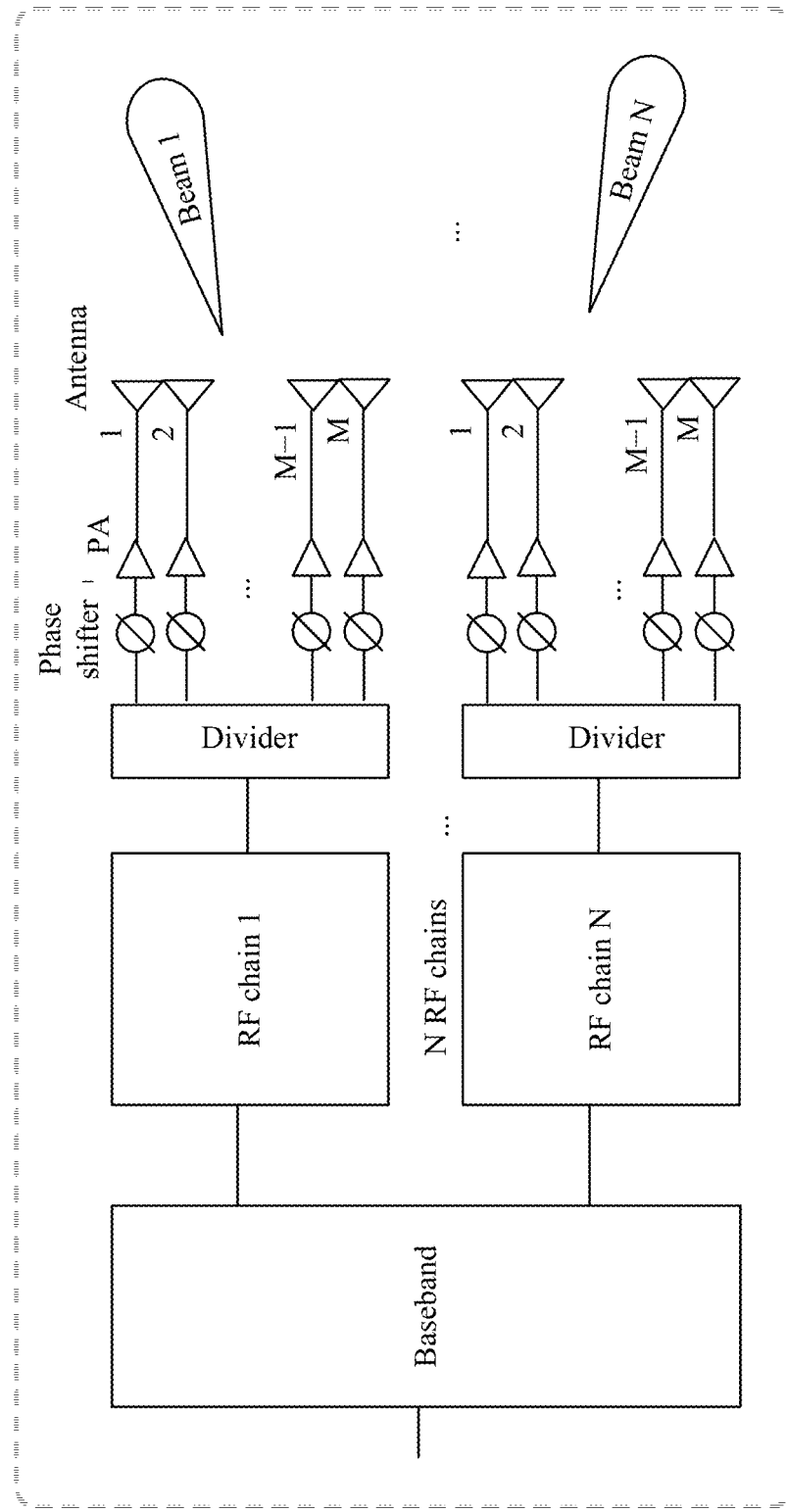
FIG. 1-B

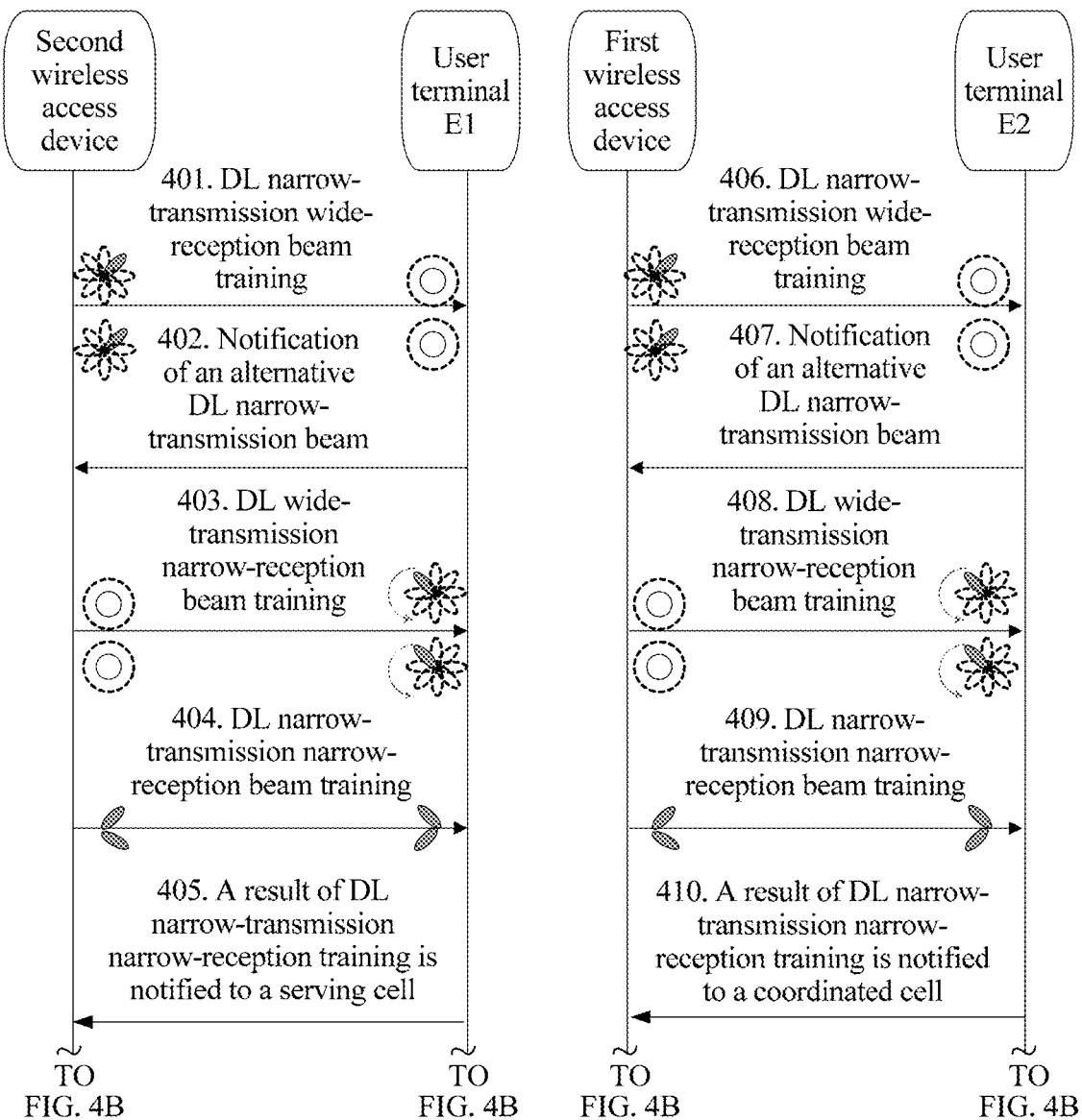
FIG. 4-A

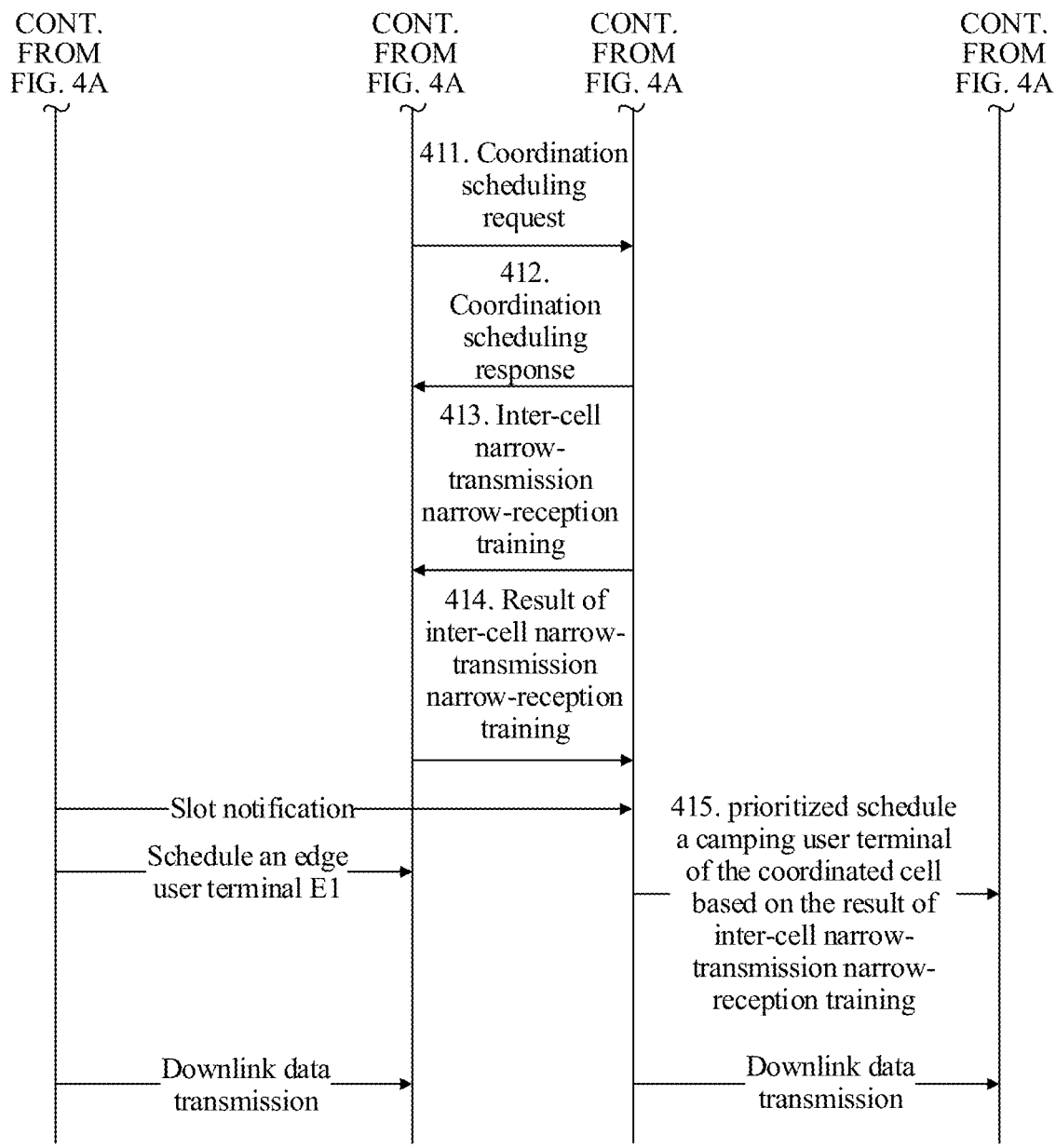
FIG. 4-B

US 10,680,770 B2

INTER-CELL BEAM COORDINATION SCHEDULING METHOD AND RELATED DEVICE

CROSS-REFERENCE TO RELATED APPLICATIONS

This application is a continuation of International Application No. PCT/CN2018/073674, filed on Jan. 22, 2018, which claims priority to Chinese Patent Application No. 201710058346.0, filed on Jan. 26, 2017. The disclosures of the aforementioned applications are hereby incorporated by reference in their entireties.

TECHNICAL FIELD

This application relates to the field of communications technologies, and in particular, to an inter-cell beam coordination scheduling method and a related device.

BACKGROUND

At present, in a high-frequency millimeter-wave communications network, a massive antenna array is usually used at a transmit end and a receive end to form an analog narrow beam, to increase antenna gains and compensate for path losses. For example, a massive antenna array in a two-level hybrid weighting form may be used to form a narrow beam. The narrow beam formed by using the massive antenna array has strong directivity, and therefore, a system capacity can be possibly maximized only by finding an optimal matched transmit-receive beam pair through beam training.

At present, cells usually only perform beam training separately and independently. For a communications network such as the high-frequency millimeter-wave communications network in which beam training is performed independently, sometimes demodulation performance of an edge user terminal in an overlapping area between neighboring cells is poor because of heavy interference. This affects a throughput of the user terminal in a cell overlapping area and a cell edge coverage capability.

SUMMARY

Embodiments of this application provide an inter-cell beam coordination scheduling method and a related device.

According to a first aspect, an embodiment of this application provides an inter-cell beam coordination scheduling method. The method includes: for example, when inter-cell beam coordination scheduling needs to be performed, receiving, by a first wireless access device serving a coordinated cell, a coordination scheduling request (the coordination scheduling request may come from, for example, a second wireless access device or an edge user terminal) specific to the edge user terminal of a serving cell, where the coordination scheduling request carries an indication of a downlink narrow-transmission beam set $D_{X1}$, and the downlink narrow-transmission beam set $D_{X1}$ is a downlink narrow-transmission beam set that satisfies a principle of minimal interference and that is determined by the edge user terminal through beam training; and in a slot in which downlink scheduling is performed on the edge user terminal in the serving cell, preferably using, by the first wireless access device, a narrow-transmission beam set $D_{X1}$ to schedule a camping user terminal of the coordinated cell in downlink. It may be understood that the downlink narrow-transmission beam set $D_{X1}$ may include one or more downlink narrow-transmission beams. The coordination scheduling request may further carry a terminal identifier of the edge user terminal.

It can be learned that in a strong-directivity scenario such as in a high-frequency system, downlink interference caused to the serving cell by a neighboring cell is transmit beam energy of the coordinated cell received by the edge user. In other words, the downlink interference is related to a direction of a downlink transmit beam of the coordinated cell. Therefore, according to the principle of minimal interference caused by the downlink transmit beam of the coordinated cell to the edge user terminal, if a receive beam of the edge user terminal is used to determine a downlink narrow-transmission beam set of the coordinated cell, it is helpful to ensure as far as possible that interference caused by the coordinated cell in downlink to the edge user terminal of the serving cell in downlink is minimal. In conclusion, this embodiment of this application provides an effective inter-cell beam coordination scheduling solution, so as to avoid as far as possible that demodulation performance of an edge user terminal in an overlapping area between neighboring cells is poor because of heavy interference, and further increase a downlink throughput of the user terminal in the cell overlapping area and improve a cell edge coverage capability.

Optionally, in some possible implementations, the downlink narrow-transmission beam set $D_{X1}$ is determined by the edge user terminal through beam training (specifically, for example, downlink narrow-transmission narrow-reception beam training) performed on a downlink narrow-reception beam set $D_{U1}$ by the first wireless access device. The downlink narrow-reception beam set $D_{U1}$ is a downlink narrow-reception beam set that satisfies a principle of strongest reception and that is determined by the edge user terminal through beam training performed by the second wireless access device. The second wireless access device is a wireless access device that serves the serving cell of the edge user terminal.

Specifically, for example, the edge user terminal determines, through narrow-transmission wide-reception beam training performed by the second wireless access device, a downlink narrow-transmission beam set $D_{f1}$ that satisfies the principle of strongest reception. The edge user terminal determines, through wide-transmission narrow-reception beam training performed by the second wireless access device, a downlink narrow-reception beam set $D_{U2}$ that satisfies the principle of strongest reception. Further, the edge user terminal accepts narrow-transmission narrow-reception beam training performed on the downlink narrow-reception beam set $D_{U2}$ by the second wireless access device by using the downlink narrow-transmission beam set $D_{f1}$, and determines, based on a result of the narrow-transmission narrow-reception beam training, the downlink narrow-reception beam set $D_{U1}$ that satisfies the principle of strongest reception. The downlink narrow-reception beam set $D_{U1}$ is a subset of the downlink narrow-reception beam set $D_{U2}$.

Optionally, in some possible implementations, the downlink narrow-transmission beam set $D_{X1}$ is determined by the edge user terminal through narrow-transmission narrow-reception beam training performed on a downlink narrow-reception beam set $X_{U1}$ by the first wireless access device by using a downlink narrow-transmission beam set $D_{X2}$. The downlink narrow-transmission beam set $D_{X2}$ is a downlink narrow-transmission beam set that satisfies the principle of minimal interference and that is determined by the edge user terminal through narrow-transmission wide-reception beam training performed by the first wireless access device. The downlink narrow-transmission beam set $D_{X1}$ is a subset of the downlink narrow-transmission beam set $D_{X2}$.

According to a second aspect, an embodiment of this application provides an inter-cell beam coordination scheduling method. The method includes: determining, by an edge user terminal of a serving cell through beam training (specifically, for example, downlink narrow-transmission narrow-reception beam training or downlink wide-transmission narrow-reception beam training) performed by a second wireless access device, a downlink narrow-reception beam set $D_{U1}$ that satisfies a principle of strongest reception, where the second wireless access device is a wireless access device that serves the serving cell of the edge user terminal;

determining, by the edge user terminal through beam training (specifically, for example, downlink narrow-transmission narrow-reception beam training) performed on the downlink narrow-reception beam set $D_{U1}$ by a first wireless access device, a downlink narrow-transmission beam set $D_{X1}$ that satisfies a principle of minimal interference, where the first wireless access device is a wireless access device that serves a coordinated cell of the edge user terminal; and sending, by the edge user terminal, a coordination scheduling request to the first wireless access device or sending, by the edge user terminal, a coordination scheduling request to the first wireless access device by using the second wireless access device, where the coordination scheduling request carries an indication of the downlink narrow-transmission beam set $D_{X1}$ and a terminal identifier of the edge user terminal, and the coordination scheduling request is used to instruct the first wireless access device to preferably use, in a slot in which downlink scheduling is performed on the edge user terminal in the serving cell, a narrow-transmission beam in the downlink narrow-transmission beam set $D_{X1}$ to schedule a camping user terminal of the coordinated cell in downlink.

Optionally, in some possible implementations, the determining, by the edge user terminal through beam training performed on the downlink narrow-reception beam set $D_{U1}$ by a first wireless access device, a downlink narrow-transmission beam set $D_{X1}$ that satisfies a principle of minimal interference includes: determining, by the edge user terminal through narrow-transmission wide-reception beam training performed by the first wireless access device, a downlink narrow-transmission beam set $D_{X2}$ that satisfies the principle of minimal interference; and accepting, by the edge user terminal, narrow-transmission narrow-reception beam training performed on the downlink narrow-reception beam set $D_{U1}$ by the first wireless access device by using the downlink narrow-transmission beam set $D_{X2}$, and determining, based on a result of the narrow-transmission narrow-reception beam training, the downlink narrow-transmission beam set $D_{X1}$ that satisfies the principle of minimal interference, where the downlink narrow-transmission beam set $D_{X1}$ is a subset of the downlink narrow-transmission beam set $D_{X2}$.

Optionally, in some possible implementations, the determining, by an edge user terminal through beam training performed by a second wireless access device, a downlink narrow-reception beam set $D_{U1}$ that satisfies a principle of strongest reception includes: determining, by the edge user terminal through narrow-transmission wide-reception beam training performed by the second wireless access device, a downlink narrow-transmission beam set $D_{f1}$ that satisfies the principle of strongest reception; determining, by the edge user terminal through wide-transmission narrow-reception beam training performed by the second wireless access device, a downlink narrow-reception beam set $D_{U2}$ that satisfies the principle of strongest reception; and accepting, by the edge user terminal, narrow-transmission narrow-reception beam training performed on the downlink narrow-reception beam set $D_{U2}$ by the second wireless access device by using the downlink narrow-transmission beam set $D_{f1}$, and determining, based on a result of the narrow-transmission narrow-reception beam training, the downlink narrow-reception beam set $D_{U1}$ that satisfies the principle of strongest reception, where the downlink narrow-reception beam set $D_{U1}$ is a subset of the downlink narrow-reception beam set $D_{U2}$.

According to a third aspect, an embodiment of this application provides an inter-cell beam coordination scheduling method. The method includes: for example, when inter-cell beam coordination scheduling needs to be performed, receiving, by a first wireless access device serving a coordinated cell, a coordination scheduling request, where the coordination scheduling request carries a terminal identifier, a user terminal indicated by the terminal identifier is an edge user terminal of a serving cell, and the coordination scheduling request indicates that the edge user terminal is to perform uplink beam training (for example, uplink narrow-transmission narrow-reception beam training or uplink wide-transmission narrow-reception beam training), where the coordination scheduling request comes from, for example, the second wireless access device or the edge user terminal; and determining, by the first wireless access device through the uplink beam training performed by the edge user terminal, an uplink narrow-reception beam set $U_{X1}$ that satisfies a principle of minimal interference; and in a slot in which the second wireless access device schedules the edge user terminal in uplink, scheduling, by the first wireless access device, a camping user terminal of the coordinated cell in uplink preferably based on the uplink narrow-reception beam $U_{X1}$, where the second wireless access device is a wireless access device that serves the serving cell of the edge user terminal.

Optionally, in some possible implementations, the coordination scheduling request may further carry an indication of an uplink narrow-transmission beam set $U_{U1}$, and the coordination scheduling request indicates that the edge user terminal is to perform uplink narrow-transmission beam training by using the uplink narrow-transmission beam set $U_{U1}$. The uplink narrow-transmission beam set $U_{U1}$ is an uplink narrow-transmission beam set that satisfies a principle of strongest reception and that is determined by the edge user terminal through beam training performed by the second wireless access device, or the uplink narrow-transmission beam set $U_{U1}$ is some or all uplink narrow-transmission beams supported by the edge user terminal.

It can be learned that in a strong-directivity scenario such as in a high-frequency system, uplink interference caused to the serving cell by a neighboring cell is transmit beam energy of the coordinated cell received by a wireless access device of the serving cell. In other words, the uplink interference is related to a direction of an uplink transmit beam of the coordinated cell. Therefore, according to the principle of minimal interference caused by the uplink transmit beam of the coordinated cell to the edge user terminal, if a transmit beam of the edge user terminal is used to determine an uplink narrow-reception beam set of the coordinated cell, it is helpful to ensure as far as possible that uplink interference caused by the coordinated cell to the edge user terminal of the serving cell in uplink is minimal. In conclusion, this embodiment of this application provides an effective inter-cell beam coordination scheduling solution, so as to avoid as far as possible that demodulation performance of an edge user terminal in an overlapping area between neighboring cells is poor because of heavy interference, and further increase an uplink throughput of the user terminal in the cell overlapping area and improve a cell edge coverage capability.

According to a fourth aspect, an embodiment of this application provides an inter-cell beam coordination scheduling method. The method includes: for example, when inter-cell beam coordination scheduling needs to be performed, sending, by a second wireless access device serving a serving cell or an edge user terminal of a serving cell, a coordination scheduling request to a first wireless access device serving a coordinated cell, where the coordination scheduling request carries a terminal identifier of the edge user terminal, and the coordination scheduling request indicates that the edge user terminal is to perform uplink beam training (for example, uplink narrow-transmission narrow-reception beam training or uplink wide-transmission narrow-reception beam training); and performing, by the edge user terminal, uplink beam training on the first wireless access device, so that the first wireless access device determines an uplink narrow-reception beam set $U_{X1}$ that satisfies a principle of minimal interference. The coordination scheduling request further instructs the first wireless access device to schedule, in a slot in which the second wireless access device schedules the edge user terminal in uplink, a camping user terminal of the coordinated cell in uplink preferably based on the uplink narrow-reception beam $U_{X1}$.

Optionally, in some possible implementations, the coordination scheduling request may further carry an indication of an uplink narrow-transmission beam set $U_{U1}$, and the coordination scheduling request indicates that the edge user terminal is to perform uplink narrow-transmission beam training by using the uplink narrow-transmission beam set $U_{U1}$. The uplink narrow-transmission beam set $U_{U1}$ is an uplink narrow-transmission beam set that satisfies a principle of strongest reception and that is determined by the edge user terminal through beam training performed by the second wireless access device, or the uplink narrow-transmission beam set $U_{U1}$ is some or all uplink narrow-transmission beams supported by the edge user terminal.

According to a fifth aspect, an embodiment of this application provides a wireless access device. The wireless access device is a wireless access device serving a coordinated cell, and the wireless access device includes:

a transceiver, configured to receive a coordination scheduling request, where the coordination scheduling request carries an indication of a downlink narrow-transmission beam set $D_{X1}$ and a terminal identifier, a user terminal indicated by the terminal identifier is an edge user terminal of a serving cell, and the downlink narrow-transmission beam set $D_{X1}$ is a downlink narrow-transmission beam set that satisfies a principle of minimal interference and that is determined by the edge user terminal through beam training; and a scheduler, configured to: in a slot in which downlink scheduling is performed on the edge user terminal in the serving cell of the edge user terminal, preferably a narrow-transmission beam in the downlink narrow-transmission beam set $D_{X1}$ to schedule a camping user terminal of the coordinated cell in downlink.

Optionally, in some possible implementations, the downlink narrow-transmission beam set $D_{X1}$ is determined by the edge user terminal through beam training performed on a downlink narrow-reception beam set $D_{U1}$ by the wireless access device. The downlink narrow-reception beam set $D_{U1}$ is a downlink narrow-reception beam set that satisfies a principle of strongest reception and that is determined by the edge user terminal through beam training performed by a second wireless access device. The second wireless access device is a wireless access device that serves the serving cell of the edge user terminal.

Optionally, in some possible implementations, the downlink narrow-transmission beam set $D_{X1}$ is determined by the edge user terminal through narrow-transmission narrow-reception beam training performed on the downlink narrow-reception beam set $D_{U1}$ by the wireless access device by using a downlink narrow-transmission beam set $D_{X2}$. The downlink narrow-transmission beam set $D_{X2}$ is a downlink narrow-transmission beam set that satisfies the principle of minimal interference and that is determined by the edge user terminal through narrow-transmission wide-reception beam training performed by the wireless access device. The downlink narrow-transmission beam set $D_{X1}$ is a subset of the downlink narrow-transmission beam set $D_{X2}$.

According to a sixth aspect, an embodiment of this application provides a user terminal. The user terminal is an edge user terminal of a serving cell. The user terminal includes: a controller, configured to: determine, through beam training performed by a second wireless access device, a downlink narrow-reception beam set $D_{U1}$ that satisfies a principle of strongest reception, where the second wireless access device is a wireless access device that serves the serving cell of the edge user terminal; and determine, through beam training performed on the downlink narrow-reception beam set $D_{U1}$ by a first wireless access device, a downlink narrow-transmission beam set $D_{X1}$ that satisfies a principle of minimal interference, where the first wireless access device is a wireless access device that serves a coordinated cell of the edge user terminal; and a transceiver, configured to send a coordination scheduling request to the first wireless access device or send, by the edge user terminal, a coordination scheduling request to the first wireless access device by using the second wireless access device, where the coordination scheduling request carries an indication of the downlink narrow-transmission beam set $D_{X1}$ and a terminal identifier of the edge user terminal, and the coordination scheduling request is used to instruct the first wireless access device to preferably use, in a slot in which downlink scheduling is performed on the edge user terminal in the serving cell, a narrow-transmission beam in the downlink narrow-transmission beam set $D_{X1}$ to schedule a camping user terminal of the coordinated cell in downlink.

Optionally, in some possible implementations, in terms of determining, through beam training performed on the downlink narrow-reception beam set $D_{U1}$ by the first wireless access device, the downlink narrow-transmission beam set $D_{X1}$ that satisfies the principle of minimal interference, the controller is configured to: determine, through narrow-transmission wide-reception beam training performed by the first wireless access device, a downlink narrow-transmission beam set $D_{X2}$ that satisfies the principle of minimal interference; accept narrow-transmission narrow-reception beam training performed on the downlink narrow-reception beam set $D_{U1}$ by the first wireless access device by using the downlink narrow-transmission beam set $D_{X2}$, and determine, based on a result of the narrow-transmission narrow-reception beam training, the downlink narrow-transmission beam set $D_{X1}$ that satisfies the principle of minimal interference, where the downlink narrow-transmission beam set $D_{X1}$ is a subset of the downlink narrow-transmission beam set $D_{X2}$.

Optionally, in some possible implementations, in terms of determining, through beam training performed by the second wireless access device, the downlink narrow-reception beam set $D_{U1}$ that satisfies the principle of strongest reception, the controller is configured to: determine, through narrow-transmission wide-reception beam training performed by the second wireless access device, a downlink narrow-transmission beam set $D_{f1}$ that satisfies the principle of strongest reception; determine, through wide-transmission narrow-reception beam training performed by the second wireless access device, a downlink narrow-reception beam set $D_{U2}$ that satisfies the principle of strongest reception; accept narrow-transmission narrow-reception beam training performed on the downlink narrow-reception beam set $D_{U2}$ by the second wireless access device by using the downlink narrow-transmission beam set $D_{f1}$; and determine, based on a result of the narrow-transmission narrow-reception beam training, the downlink narrow-reception beam set $D_{U1}$ that satisfies the principle of strongest reception, where the downlink narrow-reception beam set $D_{U1}$ is a subset of the downlink narrow-reception beam set $D_{U2}$.

According to a seventh aspect, an embodiment of this application provides a wireless access device. The wireless access device is a wireless access device serving a coordinated cell, and the wireless access device includes:

a transceiver, configured to receive a coordination scheduling request, where the coordination scheduling request carries a terminal identifier, a user terminal indicated by the terminal identifier is an edge user terminal of a serving cell, and the coordination scheduling request indicates that the edge user terminal is to perform uplink beam training; and a controller, configured to determine, through the uplink beam training performed by the edge user terminal, an uplink narrow-reception beam set $U_{X1}$ that satisfies a principle of minimal interference; and in a slot in which a second wireless access device schedules the edge user terminal in uplink, schedule a camping user terminal of the coordinated cell in uplink preferably based on the uplink narrow-reception beam $U_{X1}$, where the second wireless access device is a wireless access device that serves the serving cell of the edge user terminal.

Optionally, in some possible implementations, the coordination scheduling request may further carry an indication of an uplink narrow-transmission beam set $U_{U1}$, and the coordination scheduling request indicates that the edge user terminal is to perform uplink narrow-transmission beam training by using the uplink narrow-transmission beam set $U_{U1}$.

The uplink narrow-transmission beam set $U_{U1}$ is an uplink narrow-transmission beam set that satisfies a principle of strongest reception and that is determined by the edge user terminal through beam training performed by the second wireless access device, or the uplink narrow-transmission beam set $U_{U1}$ is some or all uplink narrow-transmission beams supported by the edge user terminal.

Optionally, in some possible implementations, the coordination scheduling request comes from the second wireless access device or the edge user terminal.

According to an eighth aspect, an embodiment of this application provides a wireless access device, including a processor, a communications interface, and a storage component that are coupled to each other, where the processor is configured to perform some or all steps of the methods performed by the wireless access device in the foregoing aspects.

According to a ninth aspect, an embodiment of this application provides a user terminal, including:

a processor, a communications interface, and a storage component that are coupled to each other, where the processor is configured to perform some or all steps of the methods performed by the user terminal in the foregoing aspects.

According to a tenth aspect, an embodiment of this application provides a computer-readable storage medium. The computer-readable storage medium may include an instruction, and when the instruction runs on a computer, the computer performs some or all steps of the methods performed by the wireless access device or the user terminal in the foregoing aspects.

According to an eleventh aspect, an embodiment of this application provides a computer program product including an instruction. When the computer program product runs on a computer, the computer performs some or all steps of the methods performed by the wireless access device or the user terminal in the foregoing aspects.

BRIEF DESCRIPTION OF DRAWINGS

FIG. 1-A is a schematic structural diagram of a communications system according to an embodiment of this application;

FIG. 1-B is a schematic diagram of forming a narrow beam by using a massive antenna array in a two-level hybrid weighting form;

FIG. 4-A and FIG. 4-B are a schematic flowchart of another inter-cell beam coordination scheduling method according to an embodiment of this application;

DESCRIPTION OF EMBODIMENTS

Figure 2:
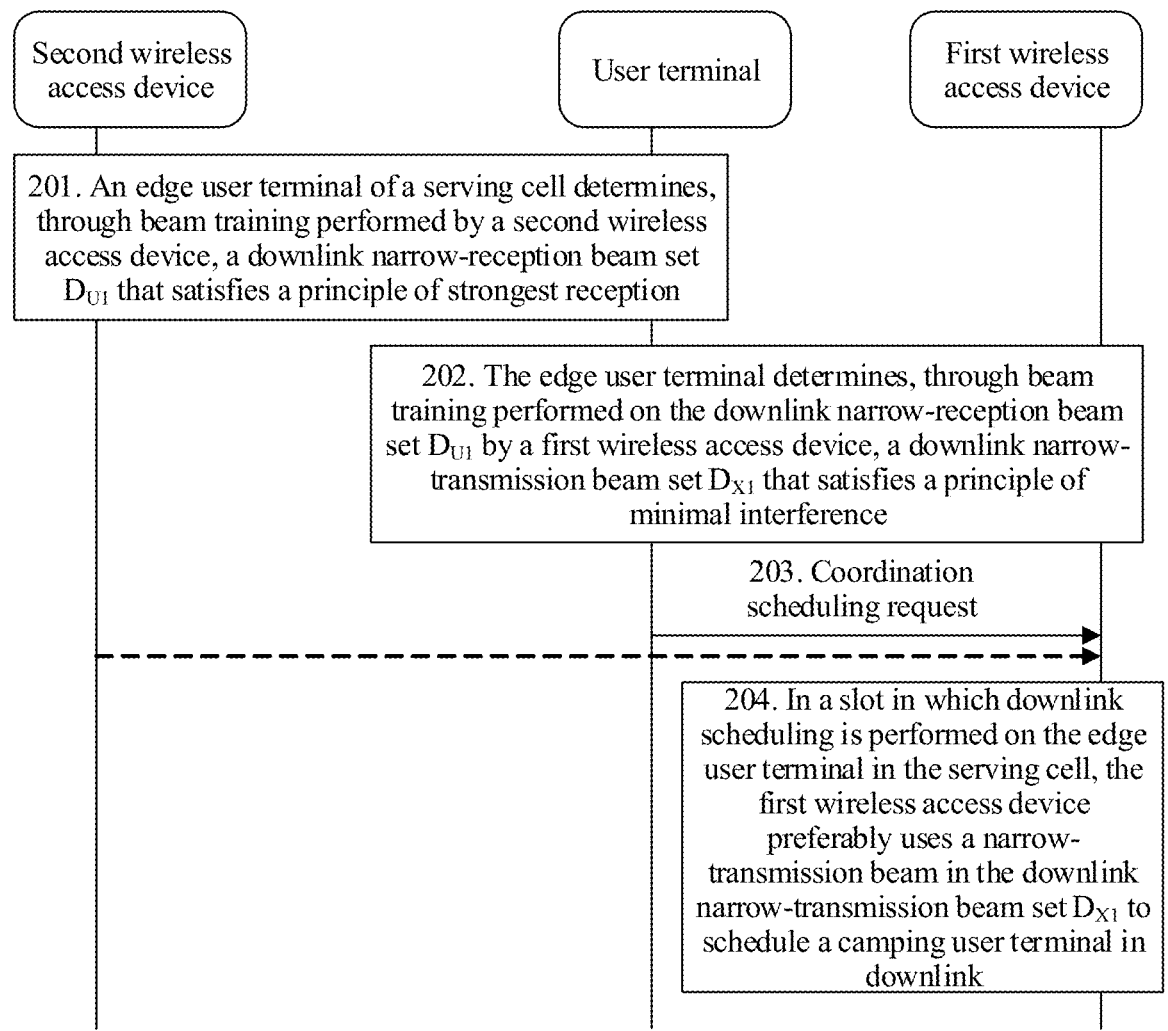
FIG. 2 is a schematic flowchart of an inter-cell beam coordination scheduling method according to an embodiment of this application.

The following describes the embodiments of this application with reference to the accompanying drawings in the embodiments of this application.

FIG. 1-A is a schematic structural diagram of a communications system according to an embodiment of this application. The communications system may include a wireless access device (the wireless access device being a base station is used as an example in FIG. 1-A) serving a serving cell, a wireless access device serving a coordinated cell, a user terminal camping on the serving cell, and a user terminal (the user terminal being UE is used as an example in FIG. 1-A) camping on the coordinated cell. The wireless access device may be responsible for beam training, user terminal scheduling, and the like. The wireless access device is configured to send a downlink signal and receive an uplink signal. The user terminal is configured to receive a downlink signal and send an uplink signal.

In this embodiment of this application, the wireless access device may be an access point (English: access Point, AP for short), a base station (for example, an evolved base station), or the like. The user terminal is, for example, a mobile station (English: mobile station, MS for short), user equipment (English: User Equipment, UE for short), a station (English: Station, STA for short), or a user terminal of another form.

It is found through research and practice that long-distance transmission and wide area coverage are hard to achieve because of a high spatial loss of a high frequency signal. Because of a high path loss and heavy interference, performance of a multi-cell edge user terminal in intra-frequency networking needs to be improved. In a communications system such as a high-frequency millimeter-wave communications system, selection of cell-independent analog beam directions may result in poor demodulation performance of an edge user terminal due to heavy interference, thereby affecting an edge coverage capability at a high frequency. For a communications network such as a high-frequency millimeter-wave communications network in which independent beam training is performed, effective inter-cell coordination is lacking in a conventional technology. If beams resulting from independent beam training performed by neighboring cells direct to a cell overlapping area, demodulation performance of an edge user terminal in the overlapping area between the neighboring cells is very likely to become poor because of heavy interference. This affects a throughput of the user terminal in the cell overlapping area and a cell edge coverage capability. This embodiment of this application provides an effective inter-cell beam coordination scheduling solution, so as to avoid as far as possible poor demodulation performance, because of heavy interference, of the edge user terminal in the overlapping area between the neighboring cells, and further increase a throughput of the user terminal in the cell overlapping area and improve a cell edge coverage capability.

FIG. 1-B is a schematic architectural diagram of an analog-digital weighting system. In the embodiments of this application, a wireless access device or a user terminal may include a two-level digital weighting system or a hybrid beamforming (English: Hybrid Beamforming, HBF for short) analog-digital weighting system, where the two-level digital weighting system or the HBF analog-digital weighting system is a system forming a beam and a MIMO weight value. The two-level digital weighting is termed for a full-digital architecture. The full-digital architecture is an architecture in which each radio frequency (English: Radio Frequency, RF for short) chain (English: chain) is connected to one antenna port. The two-level digital weighting indicates that weighting is performed at two levels and is implemented at a baseband. A first-level weighting may be used for mapping from a virtual port to an RF chain, and a second-level weighting may be used for mapping from a signal flow to a virtual port.

An HBF analog-digital weighting system architecture may be shown in FIG. 1-B. The HBF analog-digital weighting system shown in FIG. 1-B may include a power amplifier (English: Power Amplifier, PA for short), a phase shifter (English: phase shifter), an RF chain, a baseband, a divider, an antenna, and another module. After a phase shifter array connected to the RF chain forms a first-level analog beam by adjusting a phase of the phase shifter, the baseband performs second-level digital weighting, to implement mapping from a signal flow to the RF channel, and finally the signal flow mapped onto the RF chain is transmitted through the antenna based on a shifted phase of the phase shifter, to form a beam.

In the embodiments of this application, a narrow beam is a directional beam relative to an omnidirectional beam. The narrow beam not necessarily has a narrow width, but indicates that radiant intensity of the narrow beam is greater than average radiant intensity within a specific angle range and has directivity.

FIG. 2 is a schematic flowchart of an inter-cell beam coordination scheduling method according to an embodiment of this application. The inter-cell beam coordination scheduling method in this embodiment of this application may include the following steps.

201. An edge user terminal of a serving cell determines, through beam training performed by a second wireless access device, a downlink narrow-reception beam set $D_{U1}$ that satisfies a principle of strongest reception. The second wireless access device is a wireless access device that serves the serving cell of the edge user terminal.

For example, that the edge user terminal determines, through beam training performed by the second wireless access device, the downlink narrow-reception beam set $D_{U1}$ that satisfies the principle of strongest reception includes the following: The edge user terminal determines, through narrow-transmission wide-reception beam training performed by the second wireless access device, a downlink narrow-transmission beam set $D_{f1}$ that satisfies the principle of strongest reception; the edge user terminal determines, through wide-transmission narrow-reception beam training performed by the second wireless access device, a downlink narrow-reception beam set $D_{U2}$ that satisfies the principle of strongest reception; and the edge user terminal accepts narrow-transmission narrow-reception beam training performed on the downlink narrow-reception beam set $D_{U2}$ by the second wireless access device by using the downlink narrow-transmission beam set $D_{f1}$, and determines, based on a result of the narrow-transmission narrow-reception beam training, the downlink narrow-reception beam set $D_{U1}$ that satisfies the principle of strongest reception, where the downlink narrow-reception beam set $D_{U1}$ is a subset of the downlink narrow-reception beam set $D_{U2}$.

For example, if a downlink narrow-transmission beam set supported by the second wireless access device is a downlink narrow-transmission beam set $D_{f0}$, the downlink narrow-transmission beam set $D_{f1}$ is a subset of the downlink narrow-transmission beam set $D_{f0}$. In the narrow-transmission wide-reception beam training, in comparison with another downlink narrow-transmission beam set in the downlink narrow-transmission beam set $D_{f0}$, the downlink narrow-transmission beam set $D_{f1}$ has a relatively strongest receive signal for the edge user terminal. Therefore, the downlink narrow-transmission beam set $D_{f1}$ is referred to as a downlink narrow-transmission beam set that satisfies the principle of strongest reception in the downlink narrow-transmission beam set $D_{f0}$. A meaning of the principle of strongest reception in another case may be deduced by analogy.

202. The edge user terminal determines, through beam training (for example, downlink narrow-transmission narrow-reception beam training) performed on the downlink narrow-reception beam set $D_{U1}$ by a first wireless access device, a downlink narrow-transmission beam set $D_{X1}$ that satisfies a principle of minimal interference. The first wireless access device is a wireless access device that serves a coordinated cell of the serving cell.

For example, that the edge user terminal determines, through beam training performed on the downlink narrow-reception beam set $D_{U1}$ by the first wireless access device, the downlink narrow-transmission beam set $D_{X1}$ that satisfies the principle of minimal interference includes the following: The edge user terminal determines, through narrow-transmission wide-reception beam training performed by the first wireless access device, a downlink narrow-transmission beam set $D_{X2}$ that satisfies the principle of minimal interference; and the edge user terminal accepts narrow-transmission narrow-reception beam training performed on the downlink narrow-reception beam set $D_{U1}$ by the first wireless access device by using the downlink narrow-transmission beam set $D_{X2}$, and determines, based on a result of the narrow-transmission narrow-reception beam training, the downlink narrow-transmission beam set $D_{X1}$ that satisfies the principle of minimal interference. The downlink narrow-transmission beam set $D_{X1}$ is a subset of the downlink narrow-transmission beam set $D_{X2}$.

For example, if a downlink narrow-transmission beam set supported by the second wireless access device is a downlink narrow-transmission beam set $X_{x0}$, the downlink narrow-transmission beam sets $D_{X1}$ and $D_{X2}$ are subsets of the downlink narrow-transmission beam set $D_{X0}$. In the narrow-transmission wide-reception beam training, in comparison with another downlink narrow-transmission beam set in the downlink narrow-transmission beam set $D_{X0}$, the downlink narrow-transmission beam set $D_{X1}$ has a relatively weakest receive signal for the edge user terminal (and therefore, interference caused to the edge user terminal is minimal). Therefore, the downlink narrow-transmission beam set $D_{X1}$ is referred to as a downlink narrow-transmission beam set that satisfies the principle of minimal interference in the downlink narrow-transmission beam set $D_{X0}$.

Likewise, for example, in the narrow-transmission narrow-reception beam training, in comparison with another downlink narrow-transmission beam set in the downlink narrow-transmission beam set $D_{X2}$, the downlink narrow-transmission beam set $D_{X1}$ has a relatively weakest receive signal for the edge user terminal. Therefore, the downlink narrow-transmission beam set $D_{X1}$ is referred to as a downlink narrow-transmission beam set that satisfies the principle of minimal interference in the downlink narrow-transmission beam set $D_{X2}$. A meaning of the principle of minimal interference in another case may be deduced by analogy.

203. The edge user terminal sends a coordination scheduling request to the first wireless access device or the edge user terminal sends a coordination scheduling request to the first wireless access device by using the second wireless access device. The coordination scheduling request carries an indication of the downlink narrow-transmission beam set $D_{X1}$. The coordination scheduling request is used to instruct the first wireless access device to preferably use, in a slot in which downlink scheduling is performed on the edge user terminal in the serving cell, a narrow-transmission beam in the downlink narrow-transmission beam set $D_{X1}$ to schedule a camping user terminal of the coordinated cell in downlink. The coordination scheduling request may further carry a terminal identifier of the edge user terminal, a cell identity of the serving cell, and the like.

204. The first wireless access device serving the coordinated cell receives the coordination scheduling request. In the slot in which downlink scheduling is performed on the edge user terminal in the serving cell (to be specific, in a slot in which the second wireless access device schedules the edge user terminal in downlink. The second wireless access device may notify the first wireless access device of the slot in which the downlink scheduling is performed on the edge user terminal), for example, when the first wireless access device determines that scheduling of the camping user terminal of the coordinated cell needs to be performed in downlink, the first wireless access device preferably uses a narrow-transmission beam in the downlink narrow-transmission beam set $D_{X1}$ to schedule the camping user terminal in downlink.

It can be learned that in a strong-directivity scenario such as in a high-frequency system, downlink interference caused to the serving cell by a neighboring cell is transmit beam energy of the coordinated cell received by the edge user. In other words, the downlink interference is related to a direction of a downlink transmit beam of the coordinated cell. Therefore, according to the principle of minimal interference caused by the downlink transmit beam of the coordinated cell to the edge user terminal, if a receive beam of the edge user terminal is used to determine a downlink narrow-transmission beam set of the coordinated cell, it is helpful to ensure as far as possible that interference caused by the coordinated cell in downlink to the edge user terminal of the serving cell in downlink is minimal. In conclusion, this embodiment of this application provides an effective inter-cell beam coordination scheduling solution, so as to avoid as far as possible that demodulation performance of an edge user terminal in an overlapping area between neighboring cells is poor because of heavy interference, and further increase a downlink throughput of the user terminal in the cell overlapping area and improve a cell edge coverage capability.

Figure 3:
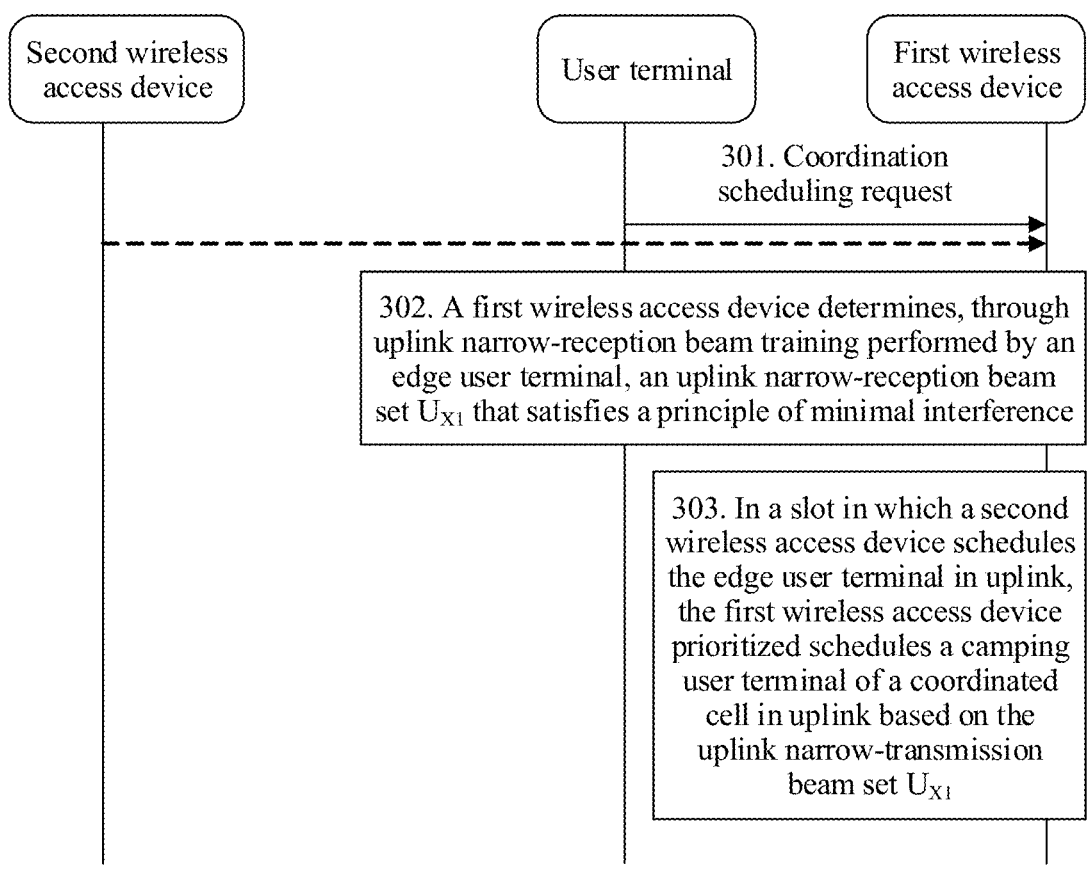
FIG. 3 is a schematic flowchart of another inter-cell beam coordination scheduling method according to an embodiment of this application.

FIG. 3 is a schematic flowchart of another inter-cell beam coordination scheduling method according to another embodiment of this application. The another inter-cell beam coordination scheduling method in the another embodiment of this application may include the following steps.

301. A second wireless access device or an edge user terminal sends a coordination scheduling request to a first wireless access device.

The second wireless access device is a wireless access device serving a serving cell, and the edge user terminal is an edge user terminal camping on the serving cell. The coordination scheduling request carries a terminal identifier, and a user terminal indicated by the terminal identifier is the edge user terminal of the serving cell. The coordination scheduling request indicates that the edge user terminal is to perform uplink beam training. In addition, the coordination scheduling request may further carry a cell identity of the serving cell and other information.

302. The first wireless access device serving a coordinated cell receives the coordination scheduling request. The first wireless access device determines, through the uplink beam training (for example, uplink narrow-transmission narrow-reception beam training or uplink wide-transmission narrow-reception beam training) performed by the edge user terminal, an uplink narrow-reception beam set $U_{X1}$ that satisfies a principle of minimal interference.

Further, the coordination scheduling request further carries an indication of an uplink narrow-transmission beam set $U_{U1}$, and the coordination scheduling request indicates that the edge user terminal is to perform uplink narrow-transmission beam training by using the uplink narrow-transmission beam set $U_{U1}$. The uplink narrow-transmission beam set $U_{U1}$ is, for example, an uplink narrow-transmission beam that satisfies a principle of strongest reception and that is determined by the edge user terminal through beam training performed by the second wireless access device, or the uplink narrow-transmission beam set $U_{U1}$ is some or all uplink narrow-transmission beams supported by the edge user terminal.

For example, if an uplink narrow-reception beam set supported by the first wireless access device is an uplink narrow-reception beam set $U_{X0}$, an uplink narrow-reception beam set $U_{X1}$ is a subset of the uplink narrow-reception beam set $U_{X0}$. In the narrow-transmission narrow-reception beam training or the wide-transmission narrow-reception beam training, in comparison with another uplink narrow-reception beam set in the uplink narrow-reception beam set $U_{X0}$, the uplink narrow reception beam set $U_{X1}$ has a relatively weakest receive signal for the first wireless access device (and therefore, interference caused to the first wireless access device is minimal). Therefore, the uplink narrow-reception beam set $U_{X1}$ is referred to as an uplink narrow-reception beam set that satisfies the principle of minimal interference in the uplink narrow-reception beam set $U_{X0}$.

303. In a slot in which the second wireless access device schedules the edge user terminal in uplink (the second wireless access device may notify, to the first wireless access device, the slot for scheduling the edge user terminal in uplink), the first wireless access device schedules a camping user terminal of the coordinated cell in uplink preferably based on an uplink narrow-reception beam $U_{X1}$.

It can be learned that in a strong-directivity scenario such as in a high-frequency system, uplink interference caused to the serving cell by a neighboring cell is transmit beam energy of the coordinated cell received by a wireless access device of the serving cell. In other words, the uplink interference is related to a direction of an uplink transmit beam of the coordinated cell. Therefore, according to the principle of minimal interference caused by the uplink transmit beam of the coordinated cell to the edge user terminal, if a transmit beam of the edge user terminal is used to determine an uplink narrow-reception beam set of the coordinated cell, it is helpful to ensure as far as possible that uplink interference caused by the coordinated cell to the edge user terminal of the serving cell in uplink is minimal. In conclusion, this embodiment of this application provides an effective inter-cell beam coordination scheduling solution, so as to avoid as far as possible that demodulation performance of an edge user terminal in an overlapping area between neighboring cells is poor because of heavy interference, and further increase an uplink throughput of the user terminal in the cell overlapping area and improve a cell edge coverage capability.

FIG. 4-A and FIG. 4-B are another schematic flowchart of another inter-cell beam coordination scheduling method according to another embodiment of this application. In this embodiment, a method for preferably determining a narrow-transmission narrow-reception beam pair of an edge user terminal in a serving cell, and then selecting a narrow-transmission narrow-reception beam pair of a coordinated cell according to a principle of minimal interference caused to the edge user terminal, to improve downlink performance of the edge user terminal. The another inter-cell beam coordination scheduling method in the another embodiment of this application may include the following steps.

401. A second wireless access device is a wireless access device of a serving cell of a user terminal E1, and the second wireless access device performs downlink (DL) narrow-transmission wide-reception beam training on the user terminal E1.

Through the downlink narrow-transmission wide-reception beam training, the user terminal E1 may determine, based on downlink RSRP, whether the user terminal E1 is an edge user terminal of the serving cell. Specifically, for example, when corresponding RSRP<$Th_1$, it is determined that the user terminal E1 is the edge user terminal. In this embodiment, determining that the user terminal E1 is the edge user terminal of the serving cell is used as an example.

In addition, through the downlink narrow-transmission wide-reception beam training, the user terminal E1 may determine a downlink narrow-transmission beam set $D_{f1}$ that satisfies a principle of strongest reception. The downlink narrow-transmission beam set $D_{f1}$ may also be referred to as an alternative downlink narrow-transmission beam set. For example, if a downlink narrow-transmission beam set supported by the second wireless access device is a downlink narrow-transmission beam set $D_{f0}$, the downlink narrow-transmission beam set $D_{f1}$ is a subset of the downlink narrow-transmission beam set $D_{f0}$. For example, in the downlink narrow-transmission wide-reception beam training, in comparison with another downlink narrow-transmission beam set in the downlink narrow-transmission beam set $D_{f0}$, the downlink narrow-transmission beam set $D_{f1}$ has a relatively strongest receive signal for the edge user terminal. Therefore, the downlink narrow-transmission beam set $D_{f1}$ is referred to as a downlink narrow-transmission beam set that satisfies the principle of strongest reception in the downlink narrow-transmission beam set $D_{f0}$.

402. The user terminal E1 notifies the second wireless access device of a downlink narrow-transmission beam set $D_{f1}$.

403. The second wireless access device performs downlink (DL) wide-transmission narrow-reception beam training on the user terminal E1.

Through the downlink wide-transmission narrow-reception beam training, the user terminal E1 may determine a downlink narrow-reception beam set $D_{U1}$ that satisfies the principle of strongest reception.

404. The edge user terminal E1 accepts narrow-transmission narrow-reception beam training performed on a downlink narrow-reception beam set $D_{U2}$ by the second wireless access device by using the downlink narrow-transmission beam set $D_{f1}$; and determines, based on a result of the narrow-transmission narrow-reception beam training, a downlink narrow-reception beam set $D_{U1}$ that satisfies a principle of strongest reception, and determines a downlink narrow-transmission beam set $D_{f2}$ that matches the downlink narrow-reception beam set $D_{U1}$. The downlink narrow-reception beam set $D_{U1}$ is a subset of the downlink narrow-reception beam set $D_{U2}$, and the downlink narrow-transmission beam set $D_{f2}$ is a subset of the downlink narrow-transmission beam set $D_{f1}$.

405. The edge user terminal E1 notifies the second wireless access device of the downlink narrow-transmission beam set $D_{f2}$.

Likewise, the first wireless access device may also perform downlink beam training on a camping user terminal of the coordinated cell.

406. The first wireless access device performs downlink (DL) narrow-transmission wide-reception beam training on a user terminal E2.

Through the downlink narrow-transmission wide-reception beam training, the user terminal E2 may determine, based on downlink RSRP, whether the user terminal E2 is an edge user terminal of the coordinated cell. Specifically, for example, when corresponding RSRP<$Th_1$, it is determined that the user terminal E2 is the edge user terminal. In this embodiment, determining that the user terminal E2 is a non-edge user terminal of the coordinated cell is used as an example.

In addition, through the downlink narrow-transmission wide-reception beam training, the user terminal E2 may determine a downlink narrow-transmission beam set $D_{X2}$ that satisfies the principle of strongest reception. The downlink narrow-transmission beam set $D_{X2}$ may also be referred to as an alternative downlink narrow-transmission beam set. For example, if a downlink narrow-transmission beam set supported by the first wireless access device is a downlink narrow-transmission beam set $D_{X0}$, the downlink narrow-transmission beam set $D_{X2}$ is a subset of the downlink narrow-transmission beam set $D_{X0}$. For example, in the downlink narrow-transmission wide-reception beam training, in comparison with another downlink narrow-transmission beam set in the downlink narrow-transmission beam set $D_{X0}$, the downlink narrow-transmission beam set $D_{X2}$ has a relatively strongest receive signal for the edge user terminal. Therefore, the downlink narrow-transmission beam set $D_{X2}$ is referred to as a downlink narrow-transmission beam set that satisfies the principle of strongest reception in the downlink narrow-transmission beam set $D_{X0}$.

407. The user terminal E2 notifies the first wireless access device of a downlink narrow-transmission beam set $D_{X1}$.

408. The first wireless access device performs downlink (DL) wide-transmission narrow-reception beam training on the user terminal E2.

Through the downlink wide-transmission narrow-reception beam training, the user terminal E2 may determine a downlink narrow-reception beam set $D_{U3}$ that satisfies the principle of strongest reception.

In addition, the coordinated cell of the edge user terminal E1 may be determined based on downlink RSRP of different cells. For example, by looking up an RSRP list of the terminal E1, when |RSRP$_{ServCell}$–RSRP$_{NeighborCell1}$|<Th2, it may be determined that the coordinated cell of the user terminal E1 is a neighboring cell NeighborCell1. RSRP$_{ServCell}$ is downlink RSRP corresponding to the serving cell, and RSRP$_{NeighborCell1}$ is downlink RSRP corresponding to a specific neighboring cell.

409. The user terminal E2 accepts narrow-transmission narrow-reception beam training performed on a downlink narrow-reception beam set $D_{U3}$ by the first wireless access device by using the downlink narrow-transmission beam set $D_{X1}$; and the user terminal E2 determines, based on a result of the narrow-transmission narrow-reception beam training, a downlink narrow-reception beam set $D_{U4}$ that satisfies the principle of strongest reception, and determines a downlink narrow-transmission beam set $D_{X4}$ that matches the downlink narrow-reception beam set $D_{U4}$. The downlink narrow-reception beam set $D_{U4}$ is a subset of the downlink narrow-reception beam set $D_{U3}$. The downlink narrow-transmission beam set $D_{X4}$ is a subset of the downlink narrow-transmission beam set $D_{X1}$.

410. The user terminal E2 notifies the first wireless access device of the downlink narrow-transmission beam set $D_{X4}$.

It may be understood that step 401 to step 405 are an intra-cell beam training process in the serving cell of the user terminal E1, and step 406 to step 410 are an intra-cell beam training process in the coordinated cell of the user terminal E1. Therefore, there is no necessary execution order between step 401 to step 405 and step 406 to step 410.

411. The user terminal E1 or the second wireless access device sends a first coordination scheduling request to the first wireless access device, where the first coordination scheduling request carries a terminal identifier of the user terminal E1.

412. When the first wireless access device agrees to perform inter-cell beam coordination scheduling for the user terminal E1, the first wireless access device sends, to the user terminal E1, a first coordinated scheduling response indicating that the first wireless access device agrees to perform inter-cell beam coordination scheduling for the user terminal E1.

413. The first wireless access device performs DL narrow-transmission narrow-reception beam training on the downlink narrow-reception beam set $D_{U1}$ for the user terminal E1.

Through the downlink narrow-transmission narrow-reception beam training performed by the first wireless access device, the user terminal E2 may determine the downlink narrow-transmission beam set $D_{X1}$ that satisfies the principle of minimal interference. For example, if a downlink narrow-transmission beam set supported by the first wireless access device is the downlink narrow-transmission beam set $D_{X0}$, the downlink narrow-transmission beam set $D_{X1}$ is a subset of the downlink narrow-transmission beam set $D_{X0}$. For example, in the downlink narrow-transmission narrow-reception beam training, in comparison with another downlink narrow-transmission beam set in the downlink narrow-transmission beam set $D_{X0}$, the downlink narrow-transmission beam set $D_{X1}$ has a relatively weakest receive signal for the edge user terminal E1. Therefore, the downlink narrow-transmission beam set $D_{X1}$ is referred to as a downlink narrow-transmission beam set that satisfies the principle of minimal interference in the downlink narrow-transmission beam set $D_{X0}$.

414. The user terminal E1 sends a second coordinated scheduling message to the first wireless access device, where the second coordinated scheduling message is used to notify the downlink narrow-transmission beam set $D_{X1}$ to the first wireless access device. The second coordinated scheduling message carries an indication of the downlink narrow-transmission beam set $D_{X1}$, and may further carry a terminal identifier of the user terminal E1 and the like.

The first wireless access device receives the second coordinated scheduling message.

415. The second wireless access device notifies the first wireless access device of a slot in which downlink scheduling is performed on the user terminal E1, and the first wireless access device accordingly learns of the slot in which the second wireless access device schedules the edge user terminal E1 in downlink. In the slot in which the second wireless access device schedules the edge user terminal E1 in downlink, the first wireless access device preferably uses a narrow-transmission beam in the downlink narrow-transmission beam set $D_{X1}$ to schedule a camping user terminal of the coordinated cell in downlink.

For example, the downlink narrow-transmission beam set $D_{X1}$ is a downlink narrow-transmission beam set that satisfies the principle of strongest reception and that is corresponding to scheduled camping user terminals of the coordinated cell. It may be understood that through the downlink beam training within the coordinated cell, these camping user terminals that consider the downlink narrow-transmission beam set $D_{X1}$ as the downlink narrow-transmission beam set that satisfies the principle of strongest reception may be determined.

In this embodiment, performing interference coordination on a downlink scheduled edge user terminal can reduce interference caused by a primary interference neighboring cell to the edge user, thereby increasing an edge user throughput and improving an edge coverage effect.

First, in a beam training stage, during narrow-transmission wide-reception beam training, when RSRP of a user is less than a threshold, it indicates that reception energy of the user terminal is still less than the threshold during omnidirectional reception, and therefore it is determined that the user terminal is an edge user terminal. Because of strong-directivity of a high frequency, downlink interference caused by a neighboring cell to the serving cell is transmit beam energy of the coordinated cell received by the edge user terminal. In other words, the downlink interference is related to a direction of a downlink transmit beam of the coordinated cell. Therefore, according to the principle of minimal interference caused by the downlink transmit beam of the coordinated cell to the edge user terminal, a receive beam of the edge user terminal is used to determine the downlink transmit beam of the coordinated cell. To ensure a capacity of the coordinated cell, according to a principle of maximum receive energy or a principle of a maximum SNR, the determined transmit beam of the coordinated cell may be used to determine a scheduled user of the coordinated cell and a receive beam of the scheduled user. The foregoing mechanism is helpful to ensure no downlink capacity loss or a minimal loss of the coordinated cell while ensuring minimal interference caused to the edge user terminal in downlink.

Figure 5:
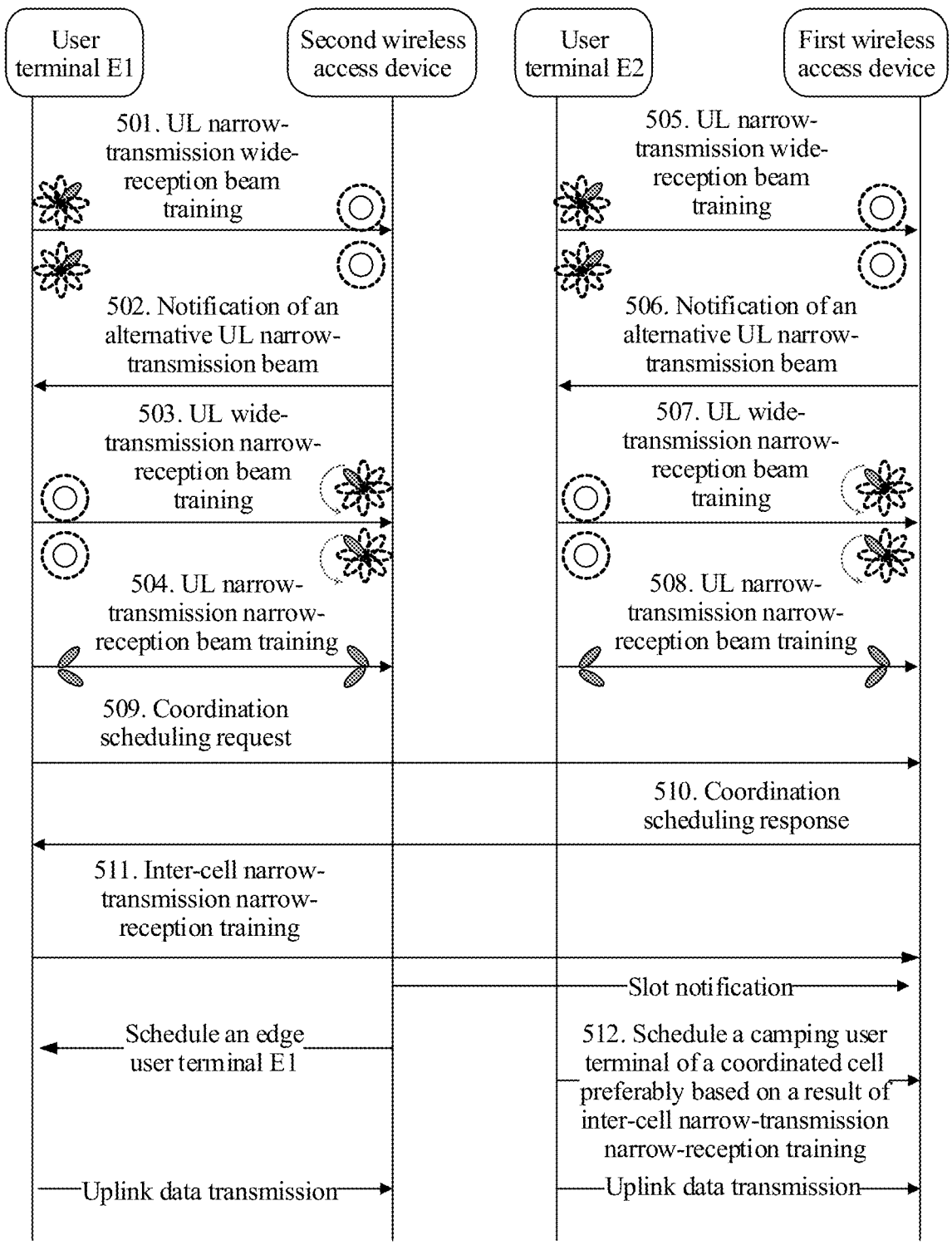
FIG. 5 is a schematic flowchart of another inter-cell beam coordination scheduling method according to an embodiment of this application.

FIG. 5 is another schematic flowchart of another inter-cell beam coordination scheduling method according to another embodiment of this application. In this application, to improve uplink edge user performance, a transmit-receive beam pair of an edge user is preferably determined, and then a narrow-transmission beam and a user that are of a coordinated neighboring cell are selected according to a principle of minimal interference caused to the edge user. The another inter-cell beam coordination scheduling method in the another embodiment of this application may include the following steps.

501. A user terminal E1 performs uplink (UL) narrow-transmission wide-reception beam training on a second wireless access device serving a serving cell of the user terminal E1.

Through the uplink narrow-transmission wide-reception beam training, the second wireless access device may determine, based on uplink RSRP, whether the user terminal E1 is an edge user terminal of the serving cell. Specifically, for example, when corresponding RSRP<$Th_1$, it is determined that the user terminal E1 is the edge user terminal. In this embodiment, determining that the user terminal E1 is the edge user terminal of the serving cell is used as an example.

In addition, through the uplink narrow-transmission wide-reception beam training, the second wireless access device may determine an uplink narrow-transmission beam set $U_{U2}$ that satisfies a principle of strongest reception. The uplink narrow-transmission beam set $U_{U2}$ may also be referred to as an alternative uplink narrow-transmission beam set. For example, if an uplink narrow-transmission beam set supported by the user terminal E1 is an uplink narrow-transmission beam set $U_{U0}$, the uplink narrow-transmission beam set $U_{U2}$ is a subset of the uplink narrow-transmission beam set $U_{U0}$. For example, in the uplink narrow-transmission wide-reception beam training, in comparison with another uplink narrow-transmission beam in the uplink narrow-transmission beam set $U_{U0}$, the uplink narrow-transmission beam set $U_{U2}$ has a relatively strongest receive signal for the second wireless access device. Therefore, the uplink narrow-transmission beam set $U_{U2}$ is referred to as an uplink narrow-transmission beam set that satisfies the principle of strongest reception in the uplink narrow-transmission beam set $U_{U0}$.

502. The second wireless access device notifies the user terminal E1 of an uplink narrow-transmission beam set $U_{U2}$.

503. The user terminal E1 performs UL wide-transmission narrow-reception beam training on the second wireless access device.

Through the uplink wide-transmission narrow-reception beam training, the second wireless access device may determine an uplink narrow-reception beam set $U_{f1}$ that satisfies the principle of strongest reception.

504. The edge user terminal E1 performs narrow-transmission narrow-reception beam training on an uplink narrow-reception beam set $U_{f1}$ of the second wireless access device by using the uplink narrow-transmission beam set $U_{U2}$, and the second wireless access device determines, based on a result of the narrow-transmission narrow-reception beam training, an uplink narrow-transmission beam set $U_{U1}$ that satisfies a principle of strongest reception, and determines an uplink narrow-reception beam set $U_{f2}$ matching the uplink narrow-transmission beam set $U_{U1}$.

The uplink narrow-transmission beam set $U_{U1}$ is a subset of the uplink narrow-transmission beam set $U_{U2}$. The uplink narrow-reception beam set $U_{f2}$ is a subset of the uplink narrow-reception beam set $U_{f1}$.

505. A camping user terminal E2 of a coordinated cell performs uplink (UL) narrow-transmission wide-reception beam training on a first wireless access device serving the coordinated cell.

Through the uplink narrow-transmission wide-reception beam training, the first wireless access device may determine, based on uplink RSRP, whether the user terminal E2 is an edge user terminal of the coordinated cell. Specifically, for example, when corresponding RSRP<$Th_1$, it is determined that the user terminal E2 is the edge user terminal. In this embodiment, determining that the user terminal E2 is a non-edge user terminal of the coordinated cell is used as an example.

In addition, through the uplink narrow-transmission wide-reception beam training, the first wireless access device may determine an uplink narrow-transmission beam set $U_{U5}$ that satisfies the principle of strongest reception. The uplink narrow-transmission beam set $U_{U5}$ may also be referred to as an alternative uplink narrow-transmission beam set. For example, if an uplink narrow-transmission beam set supported by the user terminal E2 is an uplink narrow-transmission beam set $U_{U6}$, the uplink narrow-transmission beam set $U_{U5}$ is a subset of the uplink narrow-transmission beam set $U_{U6}$. For example, in the uplink narrow-transmission wide-reception beam training, in comparison with another uplink narrow-transmission beam in the uplink narrow-transmission beam set $U_{U6}$, the uplink narrow-transmission beam set $U_{U5}$ has a relatively strongest receive signal for the first wireless access device. Therefore, the uplink narrow-transmission beam set $U_{U5}$ is referred to as an uplink narrow-transmission beam set that satisfies the principle of strongest reception in the uplink narrow-transmission beam set $U_{U6}$.

506. The first wireless access device notifies the user terminal E2 of an uplink narrow-transmission beam set $U_{U5}$.

507. The user terminal E2 performs uplink (UL) wide-transmission narrow-reception beam training on the first wireless access device.

Through the uplink wide-transmission narrow-reception beam training, the first wireless access device may determine an uplink narrow-reception beam set $U_{f3}$ that satisfies the principle of strongest reception.

In addition, the coordinated cell of the edge user terminal E1 may be determined based on uplink RSRP of different cells. For example, by looking up an RSRP list of the terminal E1, when $|RSRP_{ServCell}-RSRP_{NeighborCell1}|<Th2$, it may be determined that the coordinated cell of the user terminal E1 is a neighboring cell NeighborCell1. $RSRP_{ServCell}$ is uplink RSRP corresponding to the serving cell, and $RSRP_{NeighborCell1}$ is uplink RSRP corresponding to a specific neighboring cell.

508. The user terminal E2 performs narrow-transmission narrow-reception beam training on an uplink narrow-reception beam set $U_{f3}$ of the first wireless access device by using the uplink narrow-transmission beam set $U_{U5}$. The first wireless access device determines, based on a result of the narrow-transmission narrow-reception beam training, an uplink narrow-transmission beam set $U_{U7}$ that satisfies the principle of strongest reception, and determines an uplink narrow-reception beam set $U_{f4}$ that matches the uplink narrow-transmission beam set $U_{U7}$. The uplink narrow-transmission beam set $U_{U7}$ is a subset of the uplink narrow-transmission beam set $U_{U5}$. The uplink narrow-reception beam set $U_{f4}$ is a subset of the uplink narrow-reception beam set $U_{f3}$.

It may be understood that step 501 to step 504 are an intra-cell uplink beam training process of the serving cell of the user terminal E1, and step 505 to step 508 are an intra-cell uplink beam training process of the coordinated cell of the user terminal E1. Therefore, there is no necessary execution order between step 501 to step 504 and step 505 to step 508.

509. The user terminal E1 or the second wireless access device sends a first coordination scheduling request to the first wireless access device.

510. When the first wireless access device agrees to perform inter-cell beam coordination scheduling for the user terminal E1, the first wireless access device sends, to the user terminal E1, a first coordinated scheduling response indicating that the first wireless access device agrees to perform inter-cell beam coordination scheduling for the user terminal E1.

511. The user terminal E1 performs UL narrow-transmission narrow-reception beam training on the uplink narrow-transmission beam set $U_{U1}$ or $U_{U2}$ for the first wireless access device Through the uplink narrow-transmission narrow-reception beam training performed by the user terminal E1, the first wireless access device may determine an uplink narrow-reception beam set $U_{x1}$ that satisfies the principle of minimal interference. For example, if an uplink narrow-reception beam set supported by the first wireless access device is an uplink narrow-reception beam set $U_{x0}$, the uplink narrow-reception beam set $U_{x1}$ is a subset of the uplink narrow-reception beam set $U_{x0}$. For example, in the uplink narrow-transmission narrow-reception beam training performed by the user terminal E1, in comparison with another uplink narrow-reception beam set in the uplink narrow-reception beam set $U_{x0}$, the uplink narrow-reception beam set $U_{x1}$ has a relatively weakest receive signal for the first wireless access device. Therefore, the uplink narrow-reception beam set $U_{x1}$ is referred to as an uplink narrow-reception beam set that satisfies the principle of minimal interference in the uplink narrow-reception beam set $U_{x0}$.

512. The second wireless access device notifies the first wireless access device of a slot for scheduling the user terminal E1 in uplink, and the first wireless access device accordingly learns of the slot in which the second wireless access device schedules the edge user terminal E1 in uplink. In the slot in which the second wireless access device schedules the edge user terminal E1 in uplink, the first wireless access device schedules a camping user terminal of the coordinated cell in uplink preferably based on the uplink narrow-reception beam set $U_{x1}$.

For example, the uplink narrow-reception beam set $U_{x1}$ is an uplink narrow-reception beam set that satisfies the principle of strongest reception and that is corresponding to scheduled camping user terminals of the coordinated cell. It may be understood that through the uplink beam training within the coordinated cell, these camping user terminals that consider the uplink narrow-reception beam set $U_{x1}$ as the uplink narrow-reception beam set that satisfies the principle of strongest reception may be determined.

In this embodiment, performing interference coordination on an uplink scheduled edge user terminal can reduce interference caused by a primary interference neighboring cell to the edge user terminal, thereby increasing an uplink edge user throughput and improving a coverage effect.

First, in a beam training stage, during user terminal-narrow transmission base station-wide reception beam training, when RSRP of a user terminal is less than a threshold, it indicates that reception energy of the user terminal is still less than the threshold during omnidirectional reception, and therefore it is determined that the user terminal is an edge user terminal. Because of strong-directivity of a high frequency, uplink interference caused by a neighboring cell to the serving cell is related to information about a location of a user terminal scheduled in the neighboring cell and information about a direction of a beam used for scheduling the user terminal in the neighboring cell, that are received by the serving cell. Therefore, according to the principle of minimal interference, an uplink transmit beam used by the coordinated cell for scheduling the user terminal is selected based on a receive beam of the serving cell. However, to ensure a capacity of the coordinated cell, after the transmit beam of the coordinated cell is determined, an uplink receive beam of the coordinated cell is determined according to the principle of strongest reception. The foregoing mechanism is helpful to ensure no uplink capacity loss or a minimal loss of the coordinated cell while ensuring minimal interference caused to a coordinated edge user.

Figure 6:
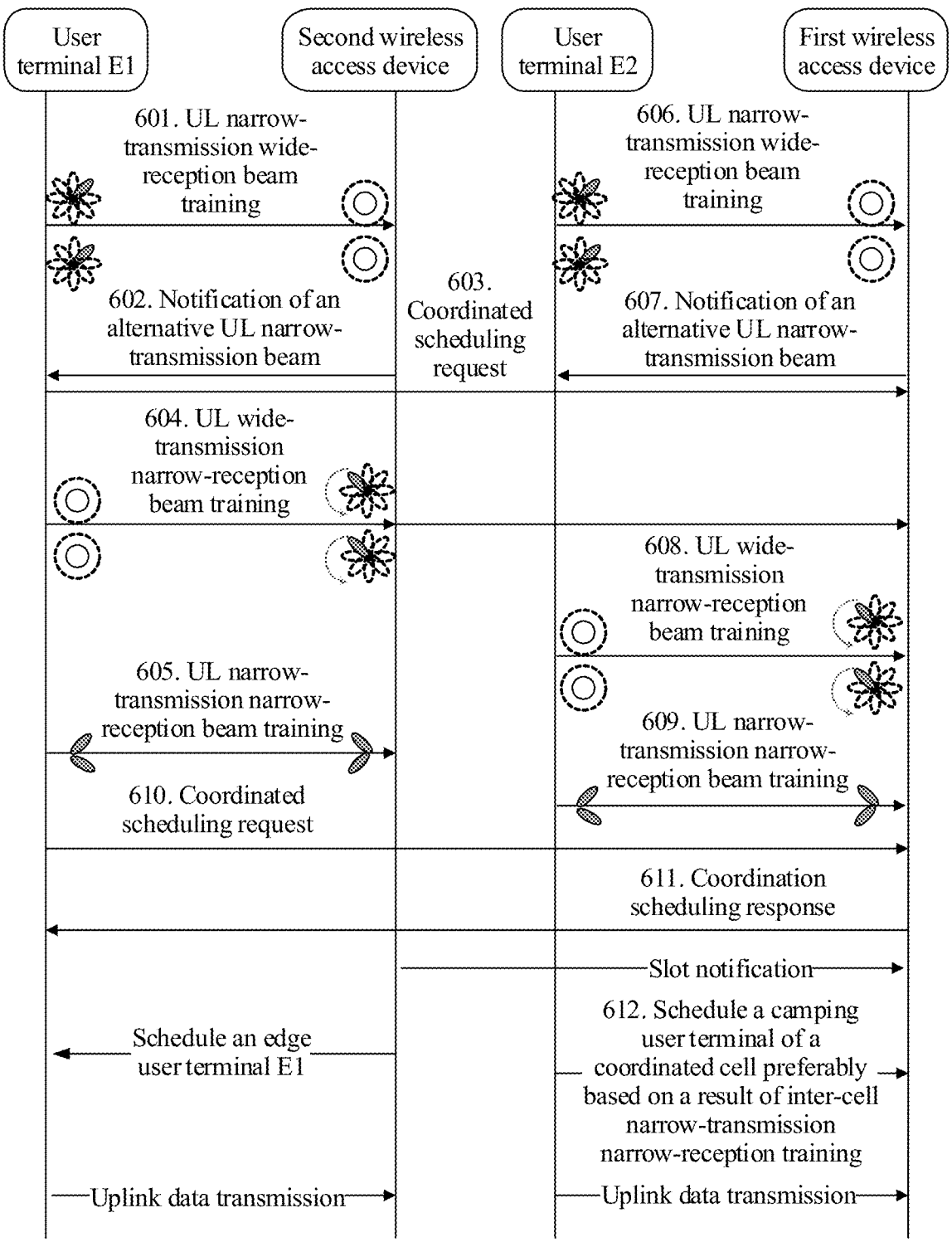
FIG. 6 is a schematic flowchart of another inter-cell beam coordination scheduling method according to an embodiment of this application.

FIG. 6 is another schematic flowchart of another inter-cell beam coordination scheduling method according to another embodiment of this application. In this application, to improve uplink edge user performance, a transmit-receive beam pair of an edge user is preferably determined, and then a narrow-transmission beam and a user that are of a coordinated neighboring cell are selected according to a principle of minimal interference caused to the edge user. The another inter-cell beam coordination scheduling method in the another embodiment of this application may include the following steps.

601. A user terminal E1 performs uplink (UL) narrow-transmission wide-reception beam training on a second wireless access device serving a serving cell of the user terminal E1.

Through the uplink narrow-transmission wide-reception beam training, the second wireless access device may determine, based on uplink RSRP, whether the user terminal E1 is an edge user terminal of the serving cell. Specifically, for example, when corresponding $RSRP<Th_1$, it is determined that the user terminal E1 is the edge user terminal. In this embodiment, determining that the user terminal E1 is the edge user terminal of the serving cell is used as an example.

In addition, through the uplink narrow-transmission wide-reception beam training, the second wireless access device may determine an uplink narrow-transmission beam set $U_{U2}$ that satisfies a principle of strongest reception. The uplink narrow-transmission beam set $U_{U2}$ may also be referred to as an alternative uplink narrow-transmission beam set. For example, if an uplink narrow-transmission beam set supported by the user terminal E1 is an uplink narrow-transmission beam set $U_{U0}$, the uplink narrow-transmission beam set $U_{U2}$ is a subset of the uplink narrow-transmission beam set $U_{U0}$. For example, in the uplink narrow-transmission wide-reception beam training, in comparison with another uplink narrow-transmission beam in the uplink narrow-transmission beam set $U_{U0}$, the uplink narrow-transmission beam set $U_{U2}$ has a relatively strongest receive signal for the second wireless access device. Therefore, the uplink narrow-transmission beam set $U_{U2}$ is referred to as an uplink narrow-transmission beam set that satisfies the principle of strongest reception in the uplink narrow-transmission beam set $U_{U0}$.

602. The second wireless access device notifies the user terminal E1 of an uplink narrow-transmission beam set $U_{U2}$.

603. The user terminal E1 sends a third coordination scheduling request to a first wireless access device, where the third coordination scheduling request indicates that the user terminal E1 is to perform UL wide-transmission narrow-reception beam training. The third coordination scheduling request carries a terminal identifier of the user terminal E1.

604. The user terminal E1 performs UL wide-transmission narrow-reception beam training on the second wireless access device and the first wireless access device.

Through the uplink wide-transmission narrow-reception beam training, the second wireless access device may determine an uplink narrow-reception beam set $U_{f1}$ that satisfies the principle of strongest reception. Through the uplink wide-transmission narrow-reception beam training, the first wireless access device may determine an uplink narrow-reception beam set $U_{x7}$ that satisfies a principle of minimal interference.

605. The edge user terminal E1 performs narrow-transmission narrow-reception beam training on an uplink narrow-reception beam set $U_{f1}$ of the second wireless access device by using the uplink narrow-transmission beam set $U_{U2}$, and the second wireless access device determines, based on a result of the narrow-transmission narrow-reception beam training, an uplink narrow-transmission beam set $U_{U1}$ that satisfies a principle of strongest reception, and determines an uplink narrow-reception beam set $U_{f2}$ matching the uplink narrow-transmission beam set $U_{U1}$.

The uplink narrow-transmission beam set $U_{U1}$ is a subset of the uplink narrow-transmission beam set $U_{U2}$. The uplink narrow-reception beam set $U_{f2}$ is a subset of the uplink narrow-reception beam set $U_{f1}$.

606. A camping user terminal E2 of a coordinated cell performs uplink (UL) narrow-transmission wide-reception beam training on the first wireless access device serving the coordinated cell.

Through the uplink narrow-transmission wide-reception beam training, the first wireless access device may determine, based on uplink RSRP, whether the user terminal E2 is an edge user terminal of the coordinated cell. Specifically, for example, when corresponding RSRP<$Th_1$, it is determined that the user terminal E2 is the edge user terminal. In this embodiment, determining that the user terminal E2 is a non-edge user terminal of the coordinated cell is used as an example.

In addition, through the uplink narrow-transmission wide-reception beam training, the first wireless access device may determine an uplink narrow-transmission beam set $U_{U5}$ that satisfies the principle of strongest reception. The uplink narrow-transmission beam set $U_{U5}$ may also be referred to as an alternative uplink narrow-transmission beam set. For example, if an uplink narrow-transmission beam set supported by the user terminal E2 is an uplink narrow-transmission beam set $U_{U6}$, the uplink narrow-transmission beam set $U_{U5}$ is a subset of the uplink narrow-transmission beam set $U_{U6}$. For example, in the uplink narrow-transmission wide-reception beam training, in comparison with another uplink narrow-transmission beam in the uplink narrow-transmission beam set $U_{U6}$, the uplink narrow-transmission beam set $U_{U5}$ has a relatively strongest receive signal for the first wireless access device. Therefore, the uplink narrow-transmission beam set $U_{U5}$ is referred to as an uplink narrow-transmission beam set that satisfies the principle of strongest reception in the uplink narrow-transmission beam set $U_{U6}$.

607. The first wireless access device notifies the user terminal E2 of an uplink narrow-transmission beam set $U_{U5}$.

608. The user terminal E2 performs uplink (UL) wide-transmission narrow-reception beam training on the first wireless access device.

Through the uplink wide-transmission narrow-reception beam training, the first wireless access device may determine an uplink narrow-reception beam set $U_{f3}$ that satisfies the principle of strongest reception.

In addition, the coordinated cell of the edge user terminal E1 may be determined based on uplink RSRP of different cells. For example, by looking up an RSRP list of the terminal E1, when $|RSRP_{ServCell}-RSRP_{NeighborCell1}|<Th2$, it may be determined that the coordinated cell of the user terminal E1 is a neighboring cell NeighborCell1. $RSRP_{ServCell}$ is uplink RSRP corresponding to the serving cell, and $RSRP_{NeighborCell1}$ is uplink RSRP corresponding to a specific neighboring cell.

609. The user terminal E2 performs narrow-transmission narrow-reception beam training on an uplink narrow-reception beam set $U_{f3}$ of the first wireless access device by using the uplink narrow-transmission beam set $U_{U5}$. The first wireless access device determines, based on a result of the narrow-transmission narrow-reception beam training, an uplink narrow-transmission beam set $U_{U7}$ that satisfies the principle of strongest reception, and determines an uplink narrow-reception beam set $U_{f4}$ that matches the uplink narrow-transmission beam set $U_{U7}$. The uplink narrow-transmission beam set $U_{U7}$ is a subset of the uplink narrow-transmission beam set $U_{U5}$. The uplink narrow-reception beam set $U_{f4}$ is a subset of the uplink narrow-reception beam set $U_{f3}$.

It may be understood that step 601 to step 605 are an intra-cell uplink beam training process of the serving cell of the user terminal E1, and step 606 to step 609 are an intra-cell uplink beam training process of the coordinated cell of the user terminal E1. Therefore, there is no necessary execution order between step 601 to step 605 and step 606 to step 609.

610. The user terminal E1 or the second wireless access device sends a first coordination scheduling request to the first wireless access device.

611. When the first wireless access device agrees to perform inter-cell beam coordination scheduling for the user terminal E1, the first wireless access device sends, to the user terminal E1, a first coordinated scheduling response indicating that the first wireless access device agrees to perform inter-cell beam coordination scheduling for the user terminal E1.

612. The second wireless access device notifies the first wireless access device of a slot for scheduling the user terminal E1 in uplink, and the first wireless access device accordingly learns of the slot in which the second wireless access device schedules the edge user terminal E1 in uplink. In the slot in which the second wireless access device schedules the edge user terminal E1 in uplink, the first wireless access device schedules a camping user terminal of the coordinated cell in uplink preferably based on the uplink narrow-reception beam set $U_{X7}$.

For example, the uplink narrow-reception beam set $U_{X7}$ is an uplink narrow-reception beam set that satisfies the principle of strongest reception and that is corresponding to scheduled camping user terminals of the coordinated cell. It may be understood that through the uplink beam training within the coordinated cell, these camping user terminals that consider the uplink narrow-reception beam set $U_{X7}$ as the uplink narrow-reception beam set that satisfies the principle of strongest reception may be determined.

In this embodiment, performing interference coordination on an uplink scheduled edge user terminal can reduce interference caused by a primary interference neighboring cell to the edge user terminal, thereby increasing an uplink edge user throughput and improving a coverage effect.

First, in a beam training stage, during user terminal-narrow transmission base station-wide reception beam training, when RSRP of a user terminal is less than a threshold, it indicates that reception energy of the user terminal is still less than the threshold during omnidirectional reception, and therefore it is determined that the user terminal is an edge user terminal. Because of strong-directivity of a high frequency, uplink interference caused by a neighboring cell to the serving cell is related to information about a location of a user terminal scheduled in the neighboring cell and information about a direction of a beam used for scheduling the user terminal in the neighboring cell, that are received by the serving cell. Therefore, according to the principle of minimal interference, an uplink transmit beam used by the coordinated cell for scheduling the user terminal is selected based on a receive beam of the serving cell. However, to ensure a capacity of the coordinated cell, after the transmit beam of the coordinated cell is determined, an uplink receive beam of the coordinated cell is determined according to the principle of strongest reception. The foregoing mechanism is helpful to ensure no uplink capacity loss or a minimal loss of the coordinated cell while ensuring minimal interference caused to a coordinated edge user.

Figure 7:
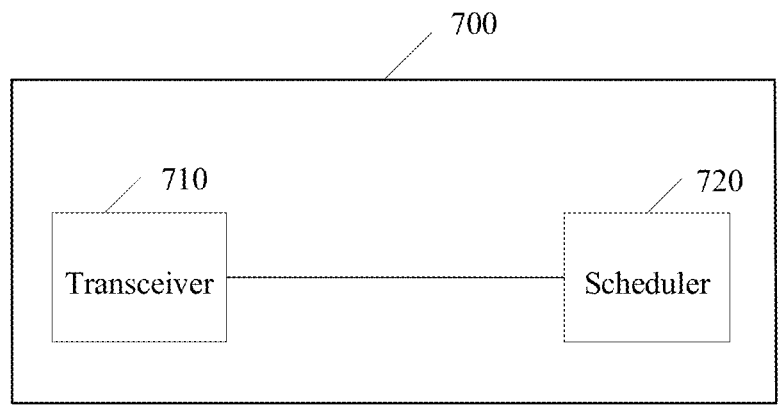
FIG. 7 is a schematic diagram of a wireless access device according to an embodiment of this application.

Referring to FIG. 7, an embodiment of this application provides a wireless access device 700. The wireless access device 700 is a wireless access device serving a coordinated cell, and the wireless access device 700 includes:

a transceiver 710, configured to receive a coordination scheduling request, where the coordination scheduling request carries an indication of a downlink narrow-transmission beam set $D_{X1}$ and a terminal identifier, a user terminal indicated by the terminal identifier is an edge user terminal of a serving cell, and the downlink narrow-transmission beam set $D_{X1}$ is a downlink narrow-transmission beam set that satisfies a principle of minimal interference and that is determined by the edge user terminal through beam training; and a scheduler 720, configured to: in a slot in which downlink scheduling is performed on the edge user terminal in the serving cell of the edge user terminal, preferably a narrow-transmission beam in the downlink narrow-transmission beam set $D_{X1}$ to schedule a camping user terminal of the coordinated cell in downlink.

Optionally, in some possible implementations, the downlink narrow-transmission beam set $D_{X1}$ is determined by the edge user terminal through beam training performed on a downlink narrow-reception beam set $D_{U1}$ by the first wireless access device. The downlink narrow-reception beam set $D_{U1}$ is a downlink narrow-reception beam set that satisfies a principle of strongest reception and that is determined by the edge user terminal through beam training performed by a second wireless access device. The second wireless access device is a wireless access device that serves the serving cell of the edge user terminal.

Optionally, in some possible implementations, the downlink narrow-transmission beam set $D_{X1}$ is determined by the edge user terminal through narrow-transmission narrow-reception beam training performed on the downlink narrow-reception beam set $D_{U1}$ by the first wireless access device by using a downlink narrow-transmission beam set $D_{X2}$. The downlink narrow-transmission beam set $D_{X2}$ is a downlink narrow-transmission beam set that satisfies the principle of minimal interference and that is determined by the edge user terminal through narrow-transmission wide-reception beam training performed by the first wireless access device. The downlink narrow-transmission beam set $D_{X1}$ is a subset of the downlink narrow-transmission beam set $D_{X2}$.

Figure 8:
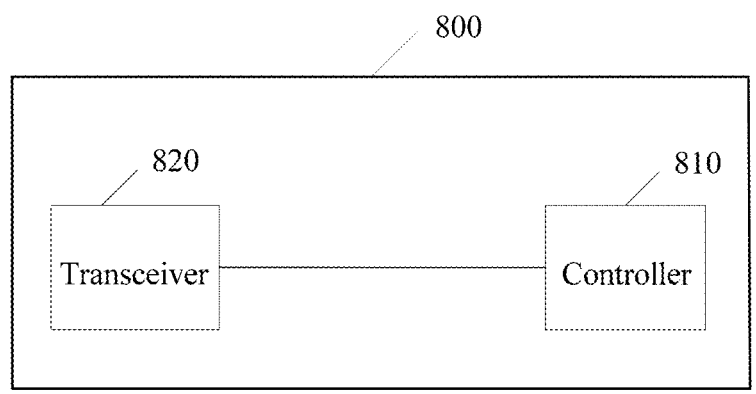
FIG. 8 is a schematic diagram of a user terminal according to an embodiment of this application.

Referring to FIG. 8, an embodiment of this application provides a user terminal 800. The user terminal 800 is an edge user terminal of a serving cell. The user terminal 800 includes a controller 810, configured to: determine, through beam training performed by a second wireless access device, a downlink narrow-reception beam set $D_{U1}$ that satisfies a principle of strongest reception, where the second wireless access device is a wireless access device that serves the serving cell of the edge user terminal; and determine, through beam training performed on the downlink narrow-reception beam set $D_{U1}$ by a first wireless access device, a downlink narrow-transmission beam set $D_{X1}$ that satisfies a principle of minimal interference, where the first wireless access device is a wireless access device that serves a coordinated cell of the edge user terminal; and a transceiver 820, configured to send a coordination scheduling request to the first wireless access device or send, by the edge user terminal, a coordination scheduling request to the first wireless access device by using the second wireless access device, where the coordination scheduling request carries an indication of the downlink narrow-transmission beam set $D_{X1}$ and a terminal identifier of the edge user terminal, and the coordination scheduling request is used to instruct the first wireless access device to preferably use, in a slot in which the serving cell schedules the edge user terminal in downlink, a narrow-transmission beam in the downlink narrow-transmission beam set $D_{X1}$ to schedule a camping user terminal of the coordinated cell in downlink.

Optionally, in some possible implementations, in terms of determining, through beam training performed on the downlink narrow-reception beam set $D_{U1}$ by the first wireless access device, the downlink narrow-transmission beam set $D_{X1}$ that satisfies the principle of minimal interference, the controller is configured to: determine, through narrow-transmission wide-reception beam training performed by the first wireless access device, a downlink narrow-transmission beam set $D_{X2}$ that satisfies the principle of minimal interference; accept narrow-transmission narrow-reception beam training performed on the downlink narrow-reception beam set $D_{U1}$ by the first wireless access device by using the downlink narrow-transmission beam set $D_{X2}$, and determine, based on a result of the narrow-transmission narrow-reception beam training, the downlink narrow-transmission beam set $D_{X1}$ that satisfies the principle of minimal interference, where the downlink narrow-transmission beam set $D_{X1}$ is a subset of the downlink narrow-transmission beam set $D_{X2}$.

Optionally, in some possible implementations, in terms of determining, through beam training performed by the second wireless access device, the downlink narrow-reception beam set $D_{U1}$ that satisfies the principle of strongest reception, the controller is configured to: determine, through narrow-transmission wide-reception beam training performed by the second wireless access device, a downlink narrow-transmission beam set $D_{f1}$ that satisfies the principle of strongest reception; determine, through wide-transmission narrow-reception beam training performed by the second wireless access device, a downlink narrow-reception beam set $D_{U2}$ that satisfies the principle of strongest reception; accept narrow-transmission narrow-reception beam training performed on the downlink narrow-reception beam set $D_{U2}$ by the second wireless access device by using the downlink narrow-transmission beam set $D_{f1}$; and determine, based on a result of the narrow-transmission narrow-reception beam training, the downlink narrow-reception beam set $D_{U1}$ that satisfies the principle of strongest reception, where the downlink narrow-reception beam set $D_{U1}$ is a subset of the downlink narrow-reception beam set $D_{U2}$.

Figure 9:
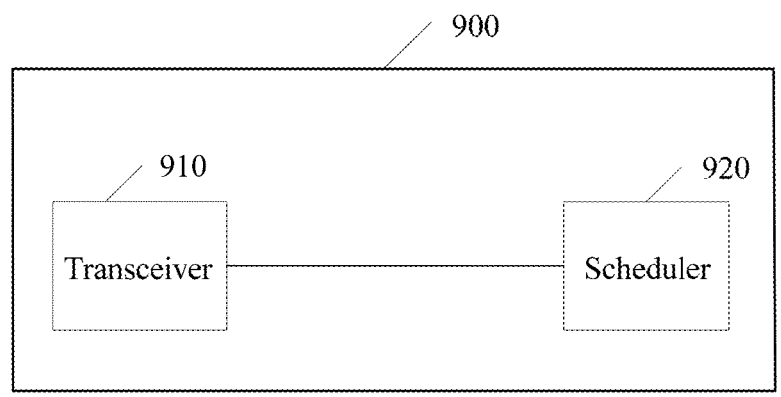
FIG. 9 is a schematic diagram of another wireless access device according to an embodiment of this application.

Referring to FIG. 9, an embodiment of this application provides a wireless access device 900. The wireless access device is a wireless access device serving a coordinated cell, and the wireless access device 900 includes:

a transceiver 910, configured to receive a coordination scheduling request, where the coordination scheduling request carries a terminal identifier, a user terminal indicated by the terminal identifier is an edge user terminal of a serving cell, and the coordination scheduling request indicates that the edge user terminal is to perform uplink beam training; and a controller 920, configured to determine, through the uplink beam training performed by the edge user terminal, an uplink narrow-reception beam set $U_{X1}$ that satisfies a principle of minimal interference; and in a slot in which a second wireless access device schedules the edge user terminal in uplink, schedule a camping user terminal of the coordinated cell in uplink preferably based on the uplink narrow-reception beam $U_{X1}$, where the second wireless access device is a wireless access device that serves the serving cell of the edge user terminal.

Optionally, in some possible implementations, the coordination scheduling request may further carry an indication of an uplink narrow-transmission beam set $U_{U1}$, and the coordination scheduling request indicates that the edge user terminal is to perform uplink narrow-transmission beam training by using the uplink narrow-transmission beam set $U_{U1}$.

The uplink narrow-transmission beam set $U_{U1}$ is an uplink narrow-transmission beam set that satisfies a principle of strongest reception and that is determined by the edge user terminal through beam training performed by the second wireless access device, or the uplink narrow-transmission beam set $U_{U1}$ is some or all uplink narrow-transmission beams supported by the edge user terminal.

Optionally, in some possible implementations, the coordination scheduling request comes from the second wireless access device or the edge user terminal.

Figure 10:
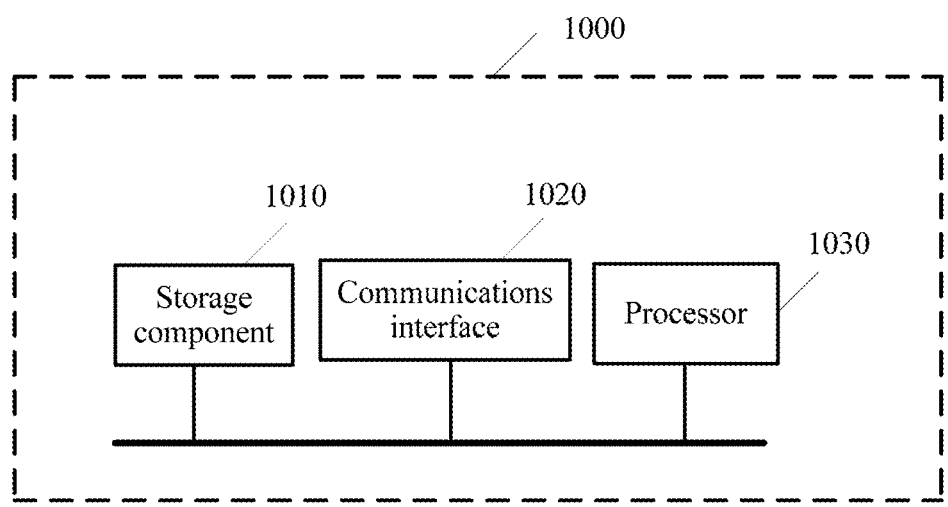
FIG. 10 is a schematic diagram of another wireless access device according to an embodiment of this application.

Referring to FIG. 10, an embodiment of this application provides a wireless access device 1000, including:

a processor 1010, a communications interface 1020, and a storage component 1030 that are coupled to each other, where the processor is configured to perform some or all steps of the methods performed by the wireless access device in the foregoing aspects.

Figure 11:
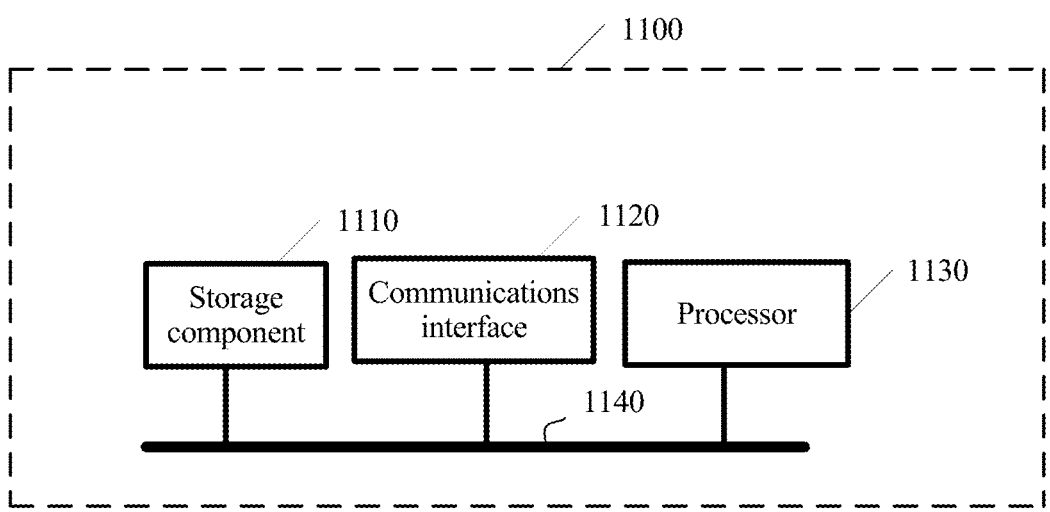
FIG. 11 is a schematic diagram of another user terminal according to an embodiment of this application.

Referring to FIG. 11, an embodiment of this application provides a user terminal 1100, including:

a processor 1130, a communications interface 1120, and a storage component 1110 that are coupled to each other, where the processor 1130 is configured to perform some or all steps of the methods performed by the user terminal in the foregoing aspects.

The storage component 1110 is configured to store an instruction, the processor 1130 is configured to execute the instruction, and the communications interface 1120 is configured to communicate with another device under control of the processor 1130. When the processor 1130 executes the instruction, the processor 1130 may perform, according to the instruction, the steps performed by the user terminal in any one of the methods in the foregoing embodiments of this application.

The processor 1130 is also referred to as a central processing unit (English: Central Processing Unit, CPU for short). The storage component 1110 may include a read-only memory and a random access memory, and provide an instruction, data, and the like to the processor 1130. A part of the storage component 1110 may further include a non-volatile random access memory. In a specific application, the components of the user terminal 1100 are coupled together by using, for example, a bus system. In addition to a data bus, the bus system may include a power bus, a control bus, a status signal bus, and the like. However, for clear description, various types of buses in the figure are denoted as the bus system 1140. The foregoing methods disclosed in the embodiments of this application may be applied to the processor 1130, or may be implemented by the processor 1130. The processor 1130 may be an integrated circuit chip and has a signal processing capability.

In an implementation process, steps of the foregoing methods can be implemented by using a hardware integrated logic circuit in the processor 1130, or by using instructions in a form of software. The processor 1130 may be a general-purpose processor, a digital signal processor, an application-specific integrated circuit, a field programmable gate array or another programmable logic device, a discrete gate or a transistor logic device, or a discrete hardware component. The processor 1130 may implement or perform the methods, the steps, and logic block diagrams disclosed in the embodiments of this application. The general-purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. The software module may be located in a mature storage medium in the art, such as a random access memory, a flash memory, a read-only memory, a programmable read-only memory, an electrically erasable programmable memory, a register, or the like. The storage medium is located in the storage component 1110. For example, the processor 1130 may read information from the storage component 1110 and complete the steps of the foregoing methods in combination with hardware of the processor.

An embodiment of this application provides a computer-readable storage medium. The computer-readable storage medium may include an instruction, and when the instruction runs on a computer, the computer performs some or all steps of the methods performed by the wireless access device or the user terminal in the foregoing aspects.

An embodiment of this application provides a computer program product including an instruction. When the computer program product runs on a computer, the computer performs some or all steps of the methods performed by the wireless access device or the user terminal in the foregoing aspects.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid state disk), or the like.

In the foregoing embodiments, the description of each embodiment has respective focuses. For a part that is not described in detail in an embodiment, refer to related descriptions in other embodiments.

In addition, an embodiment of this application further provides a computer-readable storage medium. The computer-readable storage medium stores program code used for session message processing. The program code includes an instruction used to perform some or all steps of any method of this application.

In the several embodiments provided in this application, it should be understood that the disclosed apparatus may be implemented in other manners. For example, the described apparatus embodiment is merely an example. For example, the unit division is merely logical function division or may be other division in actual implementation. For example, a plurality of units or components may be combined or integrated into another system, or some features may be ignored or not performed. In addition, the displayed or discussed mutual indirect couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a read-only memory (English: Read-Only Memory, ROM for short), a random access memory (English: Random Access Memory, RAM for short), a removable hard disk, a magnetic disk, or an optical disc.

What is claimed is:

1. An inter-cell beam coordination scheduling method, comprising:

receiving, by a first wireless access device serving a coordinated cell, a coordination scheduling request, wherein the coordination scheduling request carries an indication of a downlink narrow-transmission beam set $D_{X1}$ and a terminal identifier, wherein a user terminal indicated by the terminal identifier is an edge user terminal of a serving cell, and wherein the downlink narrow-transmission beam set $D_{X1}$ is a downlink narrow-transmission beam set that satisfies a principle of minimal interference and that is determined by the edge user terminal through beam training; and in a slot in which downlink scheduling is performed on the edge user terminal in the serving cell of the edge user terminal, prioritized using, by the first wireless access device, a narrow-transmission beam in the downlink narrow-transmission beam set $D_{X1}$ to schedule a camping user terminal of the coordinated cell in downlink, wherein the downlink narrow-transmission beam set $D_{X1}$ is determined by the edge user terminal through beam training performed on a downlink narrow-reception beam set $D_{U1}$ by the first wireless access device, wherein the downlink narrow-reception beam set $D_{U1}$ is a downlink narrow-reception beam set that satisfies a principle of strongest reception and that is determined by the edge user terminal through beam training performed by a second wireless access device, and wherein the second wireless access device is a wireless access device that serves the serving cell of the edge user terminal.

2. The method according to claim 1, wherein the downlink narrow-transmission beam set $D_{X1}$ is determined by the edge user terminal through narrow-transmission narrow-reception beam training performed on the downlink narrow-reception beam set $D_{U1}$ by the first wireless access device by using a downlink narrow-transmission beam set $D_{X2}$, wherein the downlink narrow-transmission beam set $D_{X2}$ is a downlink narrow-transmission beam set that satisfies the principle of minimal interference and that is determined by the edge user terminal through narrow-transmission wide-reception beam training performed by the first wireless access device, and wherein the downlink narrow-transmission beam set $D_{X1}$ is a subset of the downlink narrow-transmission beam set $D_{X2}$.

3. An inter-cell beam coordination scheduling method, comprising:
    determining, by an edge user terminal of a serving cell through beam training performed by a second wireless access device, a downlink narrow-reception beam set $D_{U1}$ that satisfies a principle of strongest reception, wherein the second wireless access device is a wireless access device that serves the serving cell of the edge user terminal;
    determining, by the edge user terminal through beam training performed on the downlink narrow-reception beam set $D_{U1}$ by a first wireless access device, a downlink narrow-transmission beam set $D_{X1}$ that satisfies a principle of minimal interference, wherein the first wireless access device is a wireless access device that serves a coordinated cell of the edge user terminal; and
    sending, by the edge user terminal, a coordination scheduling request to the first wireless access device or sending, by the edge user terminal, a coordination scheduling request to the first wireless access device by using the second wireless access device, wherein the coordination scheduling request carries an indication of the downlink narrow-transmission beam set $D_{X1}$ and a terminal identifier of the edge user terminal, and wherein the coordination scheduling request is used to instruct the first wireless access device to prioritized use, in a slot in which downlink scheduling is performed on the edge user terminal in the serving cell, a narrow-transmission beam in the downlink narrow-transmission beam set $D_{X1}$ to schedule a camping user terminal of the coordinated cell in downlink.

4. The method according to claim 3, wherein the determining, by the edge user terminal through beam training performed on the downlink narrow-reception beam set $D_{U1}$ by a first wireless access device, a downlink narrow-transmission beam set $D_{X1}$ that satisfies a principle of minimal interference comprises:
    determining, by the edge user terminal through narrow-transmission wide-reception beam training performed by the first wireless access device, a downlink narrow-transmission beam set $D_{X2}$ that satisfies the principle of minimal interference;
    accepting, by the edge user terminal, narrow-transmission narrow-reception beam training performed on the downlink narrow-reception beam set $D_{U1}$ by the first wireless access device by using the downlink narrow-transmission beam set $D_{X2}$; and
    determining, based on a result of the narrow-transmission narrow-reception beam training, the downlink narrow-transmission beam set $D_{X1}$ that satisfies the principle of minimal interference, wherein the downlink narrow-transmission beam set $D_{X1}$ is a subset of the downlink narrow-transmission beam set $D_{X2}$.

5. The method according to claim 3, wherein the determining, by an edge user terminal through beam training performed by a second wireless access device, a downlink narrow-reception beam set $D_{U1}$ that satisfies a principle of strongest reception comprises:
    determining, by the edge user terminal through narrow-transmission wide-reception beam training performed by the second wireless access device, a downlink narrow-transmission beam set $D_{f1}$ that satisfies the principle of strongest reception;
    determining, by the edge user terminal through wide-transmission narrow-reception beam training performed by the second wireless access device, a downlink narrow-reception beam set $D_{U2}$ that satisfies the principle of strongest reception;
    accepting, by the edge user terminal, narrow-transmission narrow-reception beam training performed on the downlink narrow-reception beam set $D_{U2}$ by the second wireless access device by using the downlink narrow-transmission beam set $D_{f1}$; and
    determining, based on a result of the narrow-transmission narrow-reception beam training, the downlink narrow-reception beam set $D_{U1}$ that satisfies the principle of strongest reception, wherein the downlink narrow-reception beam set $D_{U1}$ is a subset of the downlink narrow-reception beam set $D_{U2}$.

6. A wireless access device, wherein the wireless access device is a wireless access device that serves a coordinated cell, and wherein the wireless access device comprises:
    a transceiver, the transceiver configured to receive a coordination scheduling request, wherein the coordination scheduling request carries an indication of a downlink narrow-transmission beam set $D_{X1}$ and a terminal identifier, wherein a user terminal indicated by the terminal identifier is an edge user terminal of a serving cell, and wherein the downlink narrow-transmission beam set $D_{X1}$ is a downlink narrow-transmission beam set that satisfies a principle of minimal interference and that is determined by the edge user terminal through beam training; and
    at least one processor, the at least one processor configured to in a slot in which downlink scheduling is performed on the edge user terminal in the serving cell of the edge user terminal, prioritized use a narrow-transmission beam in the downlink narrow-transmission beam set $D_{X1}$ to schedule a camping user terminal of the coordinated cell in downlink, wherein the downlink narrow-transmission beam set $D_{X1}$ is determined by the edge user terminal through beam training performed on a downlink narrow-reception beam set $D_{U1}$ by the wireless access device, wherein the downlink narrow-reception beam set $D_{U1}$ is a downlink narrow-reception beam set that satisfies a principle of strongest reception and that is determined by the edge user terminal through beam training performed by a second wireless access device, and wherein the second wireless access device is a wireless access device that serves the serving cell of the edge user terminal.

7. The wireless access device according to claim 6, wherein the downlink narrow-transmission beam set $D_{X1}$ is determined by the edge user terminal through narrow-transmission narrow-reception beam training performed on the downlink narrow-reception beam set $D_{U1}$ by the wireless access device by using a downlink narrow-transmission beam set $D_{X2}$, wherein the downlink narrow-transmission beam set $D_{X2}$ is a downlink narrow-transmission beam set that satisfies the principle of minimal interference and that is determined by the edge user terminal through narrow-transmission wide-reception beam training performed by the wireless access device, and wherein the downlink narrow-transmission beam set $D_{X1}$ is a subset of the downlink narrow-transmission beam set $D_{X2}$.

8. An apparatus, wherein the apparatus is an edge user terminal of a serving cell, or the apparatus is located in the edge user terminal of the serving cell, and wherein the apparatus comprises:

> at least one processor, the at least one processor configured to:
>
>> determine, through beam training performed by a second wireless access device, a downlink narrow-reception beam set $D_{U1}$ that satisfies a principle of strongest reception, wherein the second wireless access device is a wireless access device that serves the serving cell of the edge user terminal; and
>>
>> determine, through beam training performed on the downlink narrow-reception beam set $D_{U1}$ by a first wireless access device, a downlink narrow-transmission beam set $D_{X1}$ that satisfies a principle of minimal interference, wherein the first wireless access device is a wireless access device that serves a coordinated cell of the edge user terminal; and
>
> a transceiver, the transceiver configured to send a coordination scheduling request to the first wireless access device or send a coordination scheduling request to the first wireless access device by using the second wireless access device, wherein the coordination scheduling request carries an indication of the downlink narrow-transmission beam set $D_{X1}$ and a terminal identifier of the edge user terminal, and wherein the coordination scheduling request is used to instruct the first wireless access device to prioritized use, in a slot in which downlink scheduling is performed on the edge user terminal in the serving cell, a narrow-transmission beam in the downlink narrow-transmission beam set $D_{X1}$ to schedule a camping user terminal of the coordinated cell in downlink.

9. The apparatus according to claim 8, wherein determining, through beam training performed on the downlink narrow-reception beam set $D_{U1}$ by the first wireless access device, the downlink narrow-transmission beam set $D_{X1}$ that satisfies the principle of minimal interference comprises:

> determining, through narrow-transmission wide-reception beam training performed by the first wireless access device, a downlink narrow-transmission beam set $D_{X2}$ that satisfies the principle of minimal interference;
>
> accepting narrow-transmission narrow-reception beam training performed on the downlink narrow-reception beam set $D_{U1}$ by the first wireless access device by using the downlink narrow-transmission beam set $D_{X2}$; and
>
> determining, based on a result of the narrow-transmission narrow-reception beam training, the downlink narrow-transmission beam set $D_{X1}$ that satisfies the principle of minimal interference, wherein the downlink narrow-transmission beam set $D_{X1}$ is a subset of the downlink narrow-transmission beam set $D_{X2}$.

10. The apparatus according to claim 8, wherein determining, through beam training performed by the second wireless access device, the downlink narrow-reception beam set $D_{U1}$ that satisfies the principle of strongest reception comprises:

> determining, through narrow-transmission wide-reception beam training performed by the second wireless access device, a downlink narrow-transmission beam set $D_{f1}$ that satisfies the principle of strongest reception;
>
> determining, through wide-transmission narrow-reception beam training performed by the second wireless access device, a downlink narrow-reception beam set $D_{U2}$ that satisfies the principle of strongest reception;
>
> accepting narrow-transmission narrow-reception beam training performed on the downlink narrow-reception beam set $D_{U2}$ by the second wireless access device by using the downlink narrow-transmission beam set $D_{f1}$; and
>
> determining, based on a result of the narrow-transmission narrow-reception beam training, the downlink narrow-reception beam set $D_{U1}$ that satisfies the principle of strongest reception, wherein the downlink narrow-reception beam set $D_{U1}$ is a subset of the downlink narrow-reception beam set $D_{U2}$.

* * * * *